US009229311B2

(12) United States Patent
Yeremian

(10) Patent No.: US 9,229,311 B2
(45) Date of Patent: Jan. 5, 2016

(54) PROJECTION DISPLAY DEVICE WITH VAPOR MEDIUM SCREEN

(71) Applicant: Active Ion Displays, Inc., Redwood City, CA (US)

(72) Inventor: Chase Yeremian, Los Angeles, CA (US)

(73) Assignee: Active Ion Displays, Inc., Redwood City, CA (US)

( * ) Notice: Subject to any disclaimer, the term of this patent is extended or adjusted under 35 U.S.C. 154(b) by 0 days.

(21) Appl. No.: 14/499,194

(22) Filed: Sep. 28, 2014

(65) Prior Publication Data

US 2015/0092266 A1   Apr. 2, 2015

Related U.S. Application Data

(60) Provisional application No. 61/884,033, filed on Sep. 28, 2013, provisional application No. 61/923,926, filed on Jan. 6, 2014, provisional application No. 61/948,475, filed on Mar. 5, 2014, provisional application No. 62/041,565, filed on Aug. 25, 2014.

(51) Int. Cl.
*G03B 21/10* (2006.01)
*G03B 21/608* (2014.01)
*A61L 9/12* (2006.01)
*G03B 21/28* (2006.01)

(52) U.S. Cl.
CPC .............. *G03B 21/608* (2013.01); *A61L 9/12* (2013.01); *G03B 21/10* (2013.01); *G03B 21/28* (2013.01)

(58) Field of Classification Search
CPC ....... G03B 21/608; G03B 21/10; G03B 21/28
USPC .............................................. 359/443; 353/28
See application file for complete search history.

(56) References Cited

U.S. PATENT DOCUMENTS

| 1,631,240 | A |   | 6/1927  | Amet |
| 3,334,816 | A |   | 8/1967  | Mizuno |
| 5,067,653 | A |   | 11/1991 | Araki et al. |
| 5,270,752 | A | * | 12/1993 | Kataoka et al. ................ 353/28 |
| 5,368,228 | A |   | 11/1994 | Adamson et al. |
| 6,819,487 | B2 | * | 11/2004 | Palovuori et al. ............ 359/443 |
| 6,857,746 | B2 | * | 2/2005  | Dyner ............................ 353/28 |
| 6,997,558 | B2 |   | 2/2006  | Perlin et al. |
| 7,222,966 | B2 | * | 5/2007  | Reichert ........................ 353/28 |
| 8,567,954 | B2 | * | 10/2013 | Koehler et al. ................. 353/7 |

(Continued)

FOREIGN PATENT DOCUMENTS

| WO | WO/2010069368 | 6/2010 |
| WO | WO/2012131554 | 10/2012 |
| WO | WO/2014046566 | 3/2014 |

*Primary Examiner* — Christopher Mahoney
(74) *Attorney, Agent, or Firm* — Lumen Patent Firm

(57) ABSTRACT

A vapor display device includes a water tank [101], an expansion chamber [102] for creating vapor (which may contain scents), an airbox [104] for creating a laminar flow of air and vapor, and a projector [107] for projecting light onto the vapor display screen. The airbox has a series of mesh and honeycomb panels, preferably made of hexagonal cells having 3/16 inch width. Preferably, the vapor consists of water droplets having mean diameters in the range from 10 to 20 microns, and the laminar flow of air and vapor comprises between 1% and 5% water vapor. Potentiometers allow user control of vapor density, vapor flow speed, and airflow speed. A modular design allows the device to be used in different orientations.

18 Claims, 23 Drawing Sheets

(56) References Cited

U.S. PATENT DOCUMENTS

| | | | |
|---|---|---|---|
| 2010/0321478 A1* | 12/2010 | Sliwa et al. | 348/51 |
| 2011/0142429 A1* | 6/2011 | Joseph | 392/394 |
| 2012/0019784 A1 | 1/2012 | Fuller et al. | |
| 2012/0154760 A1 | 6/2012 | Nutter et al. | |
| 2014/0320824 A1* | 10/2014 | Kim et al. | 353/30 |

* cited by examiner

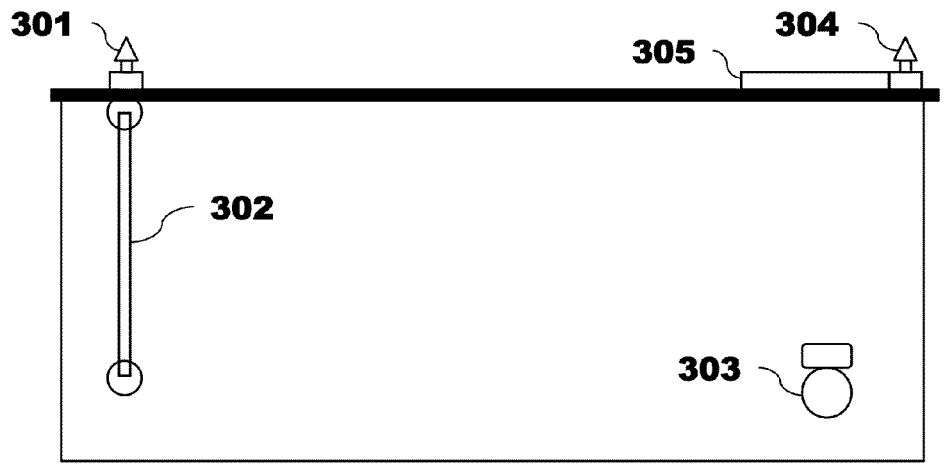
Fig. 3A
Fig. 3B
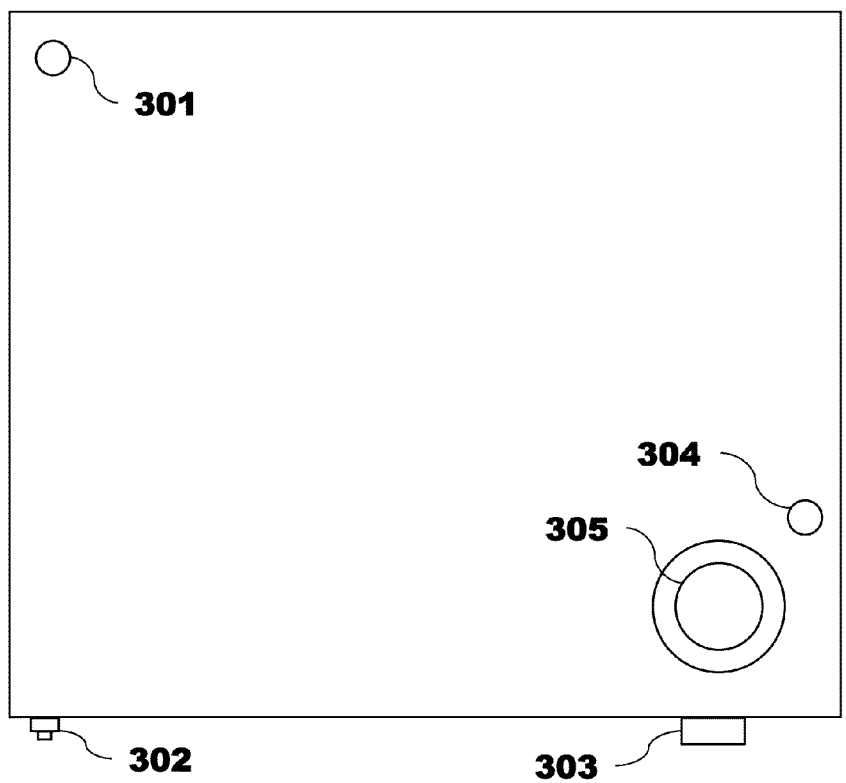

Fig. 9A
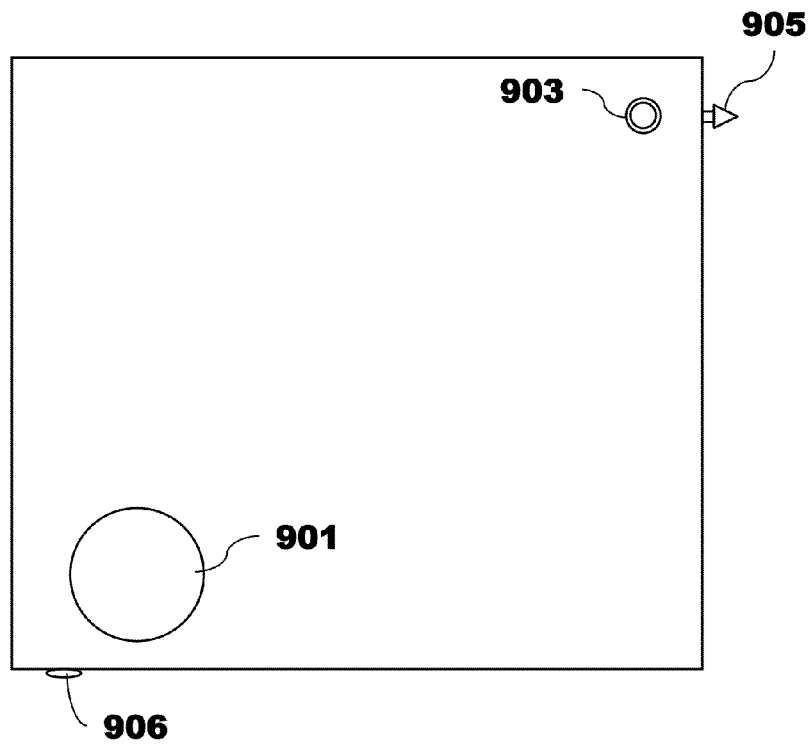
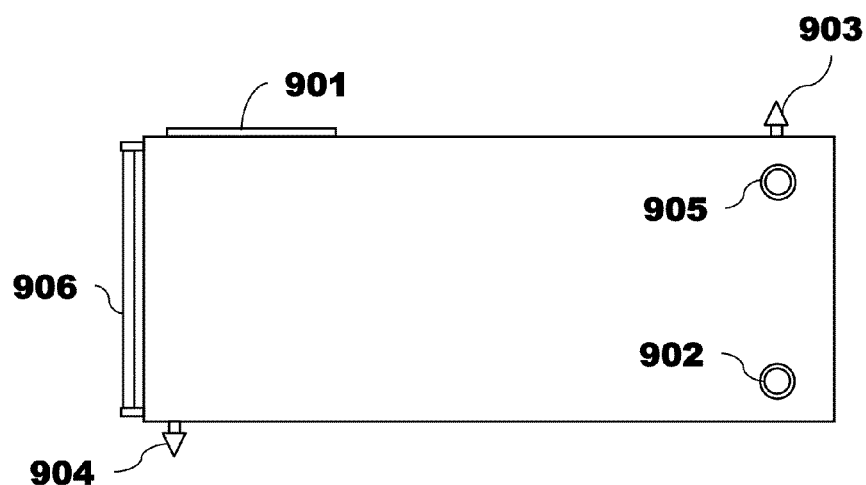
Fig. 9B

Fig. 10A
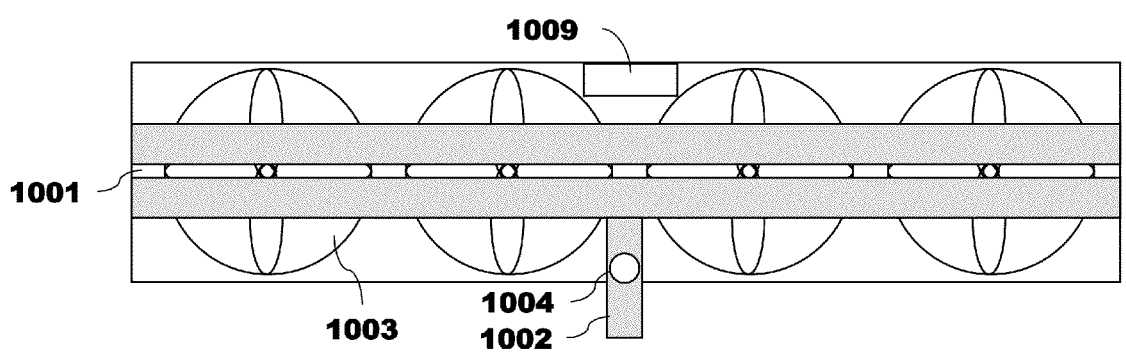
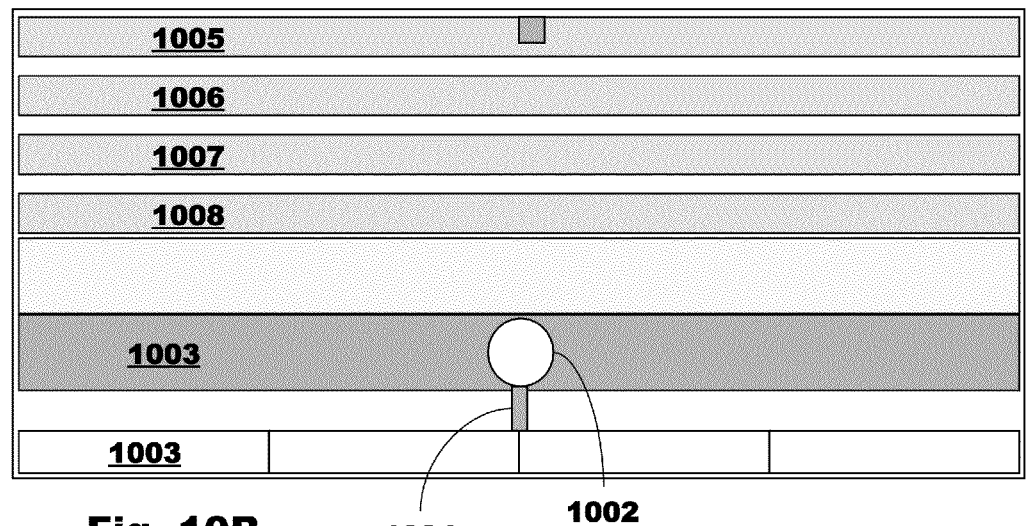
Fig. 10B

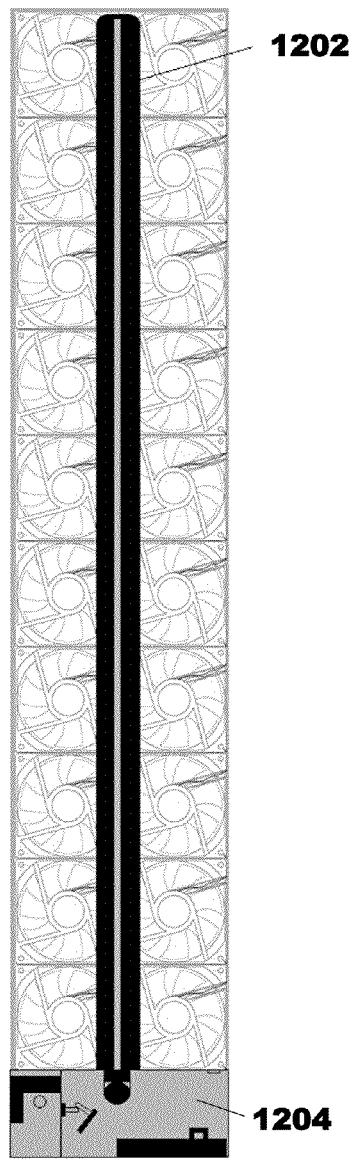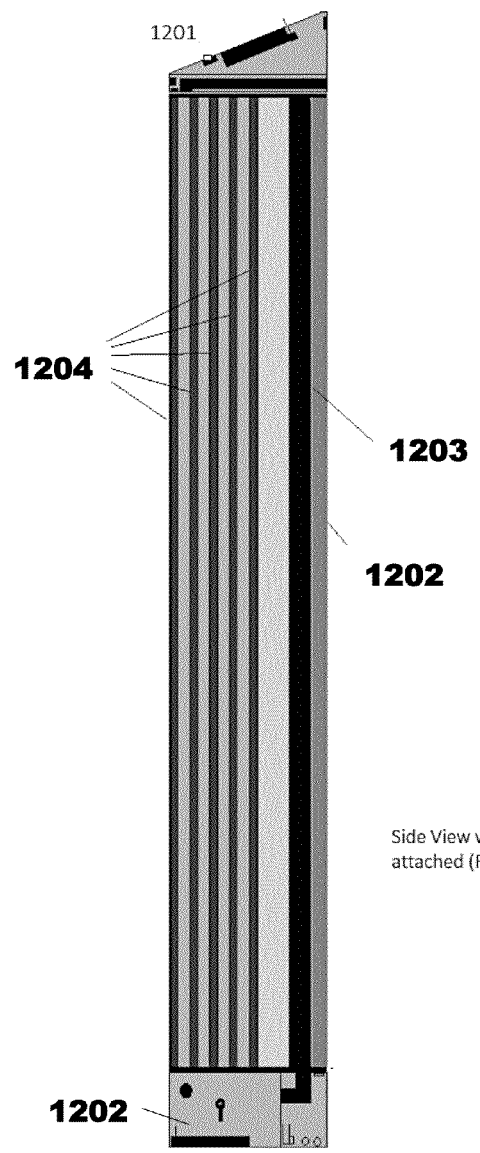
Side View with PSU attached (Fig. 1201)
Fig. 12A     Fig. 12B

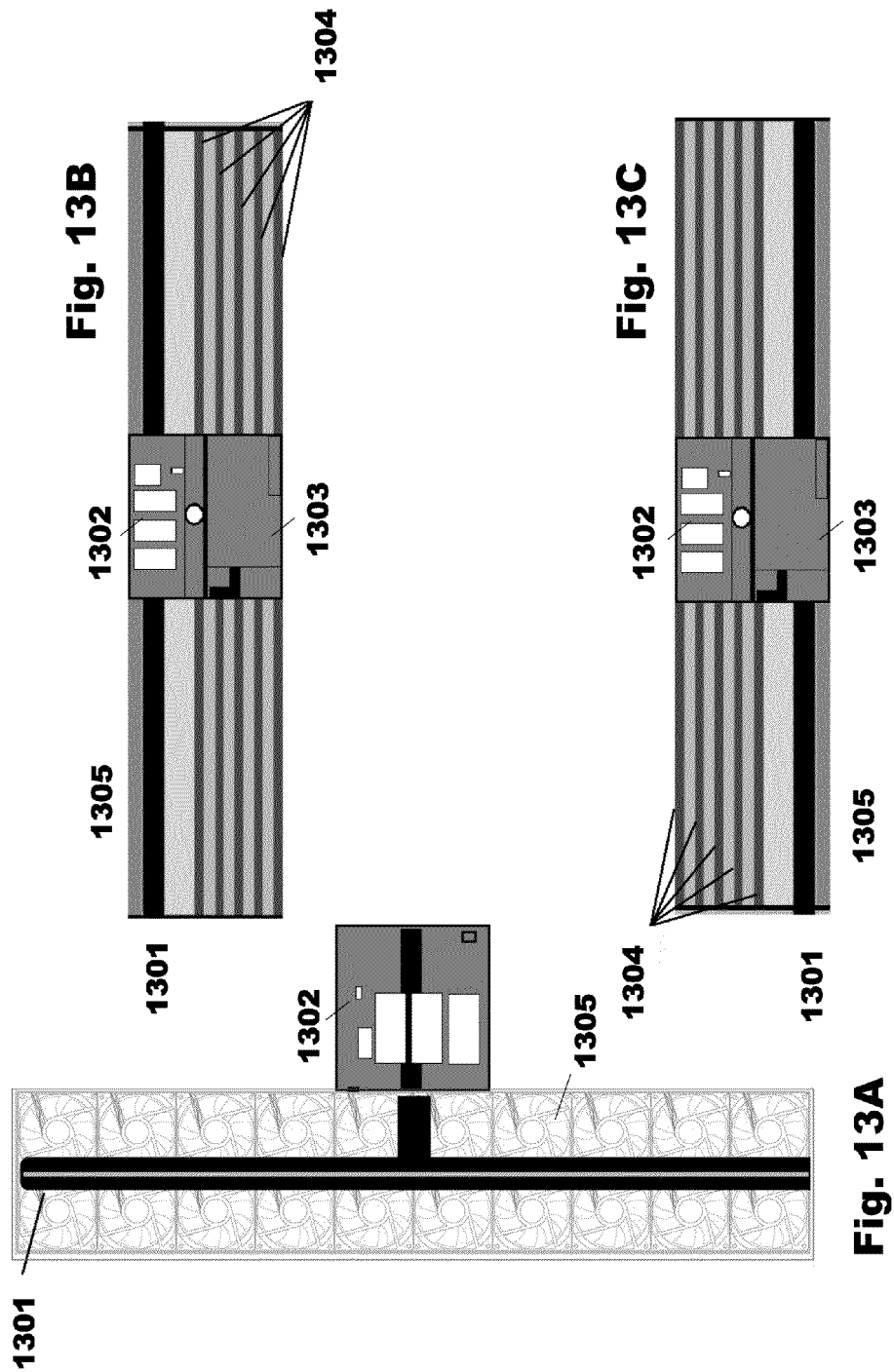

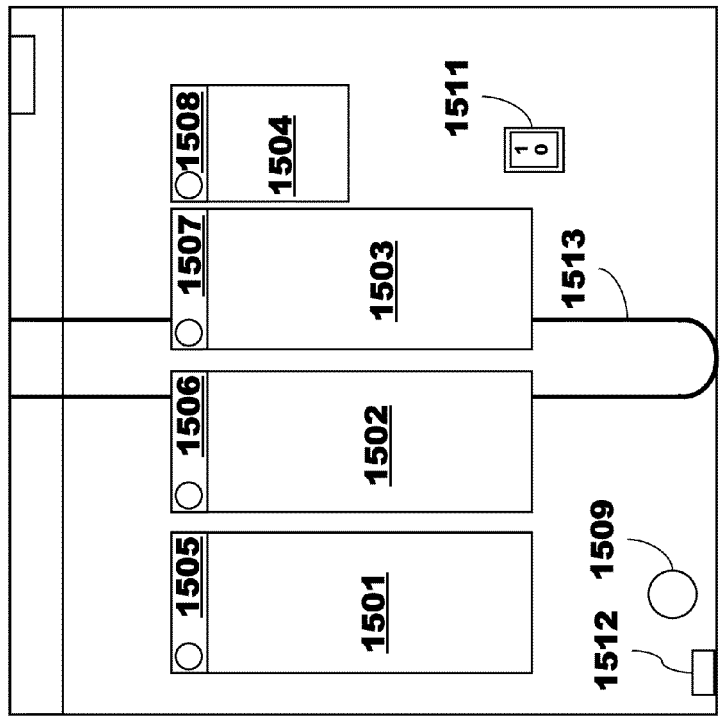
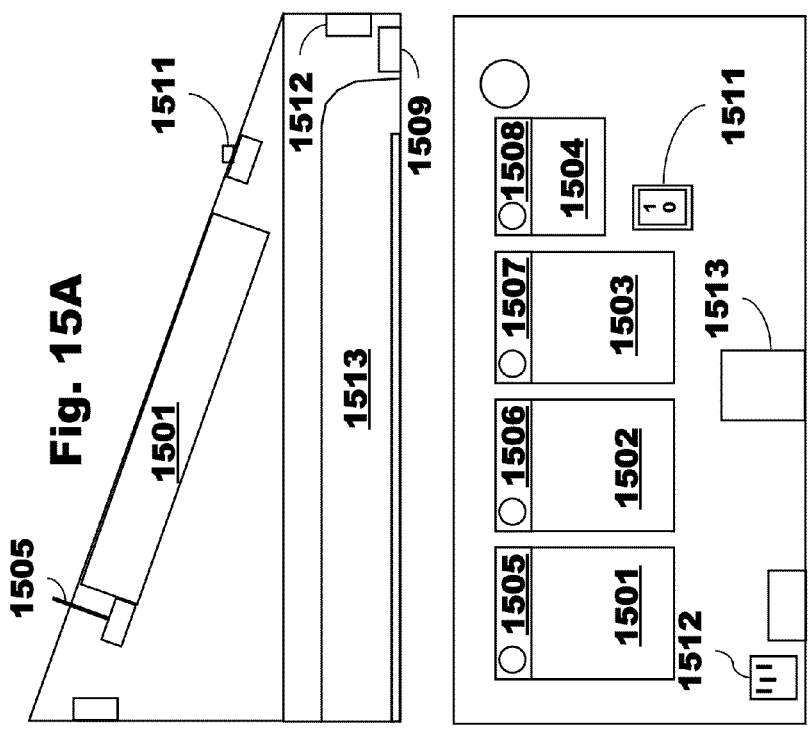
Fig. 15A  Fig. 15B  Fig. 15C

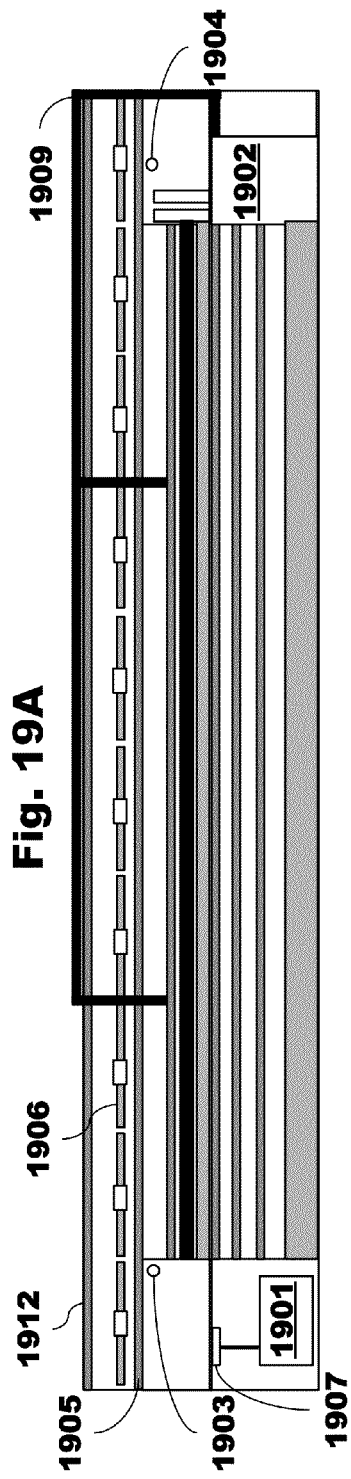
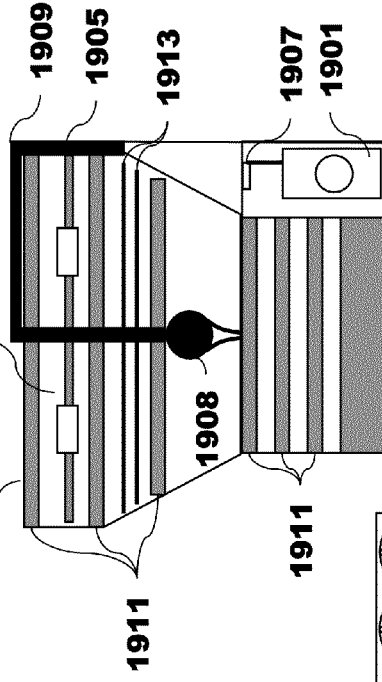
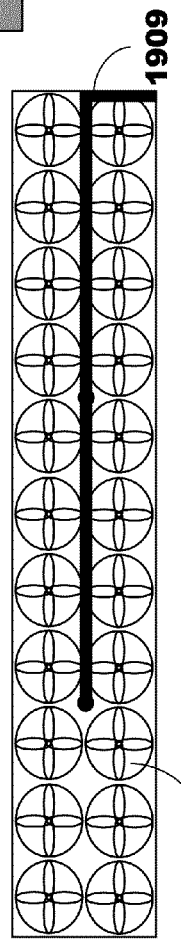
Fig. 19A
Fig. 19C
Fig. 19B

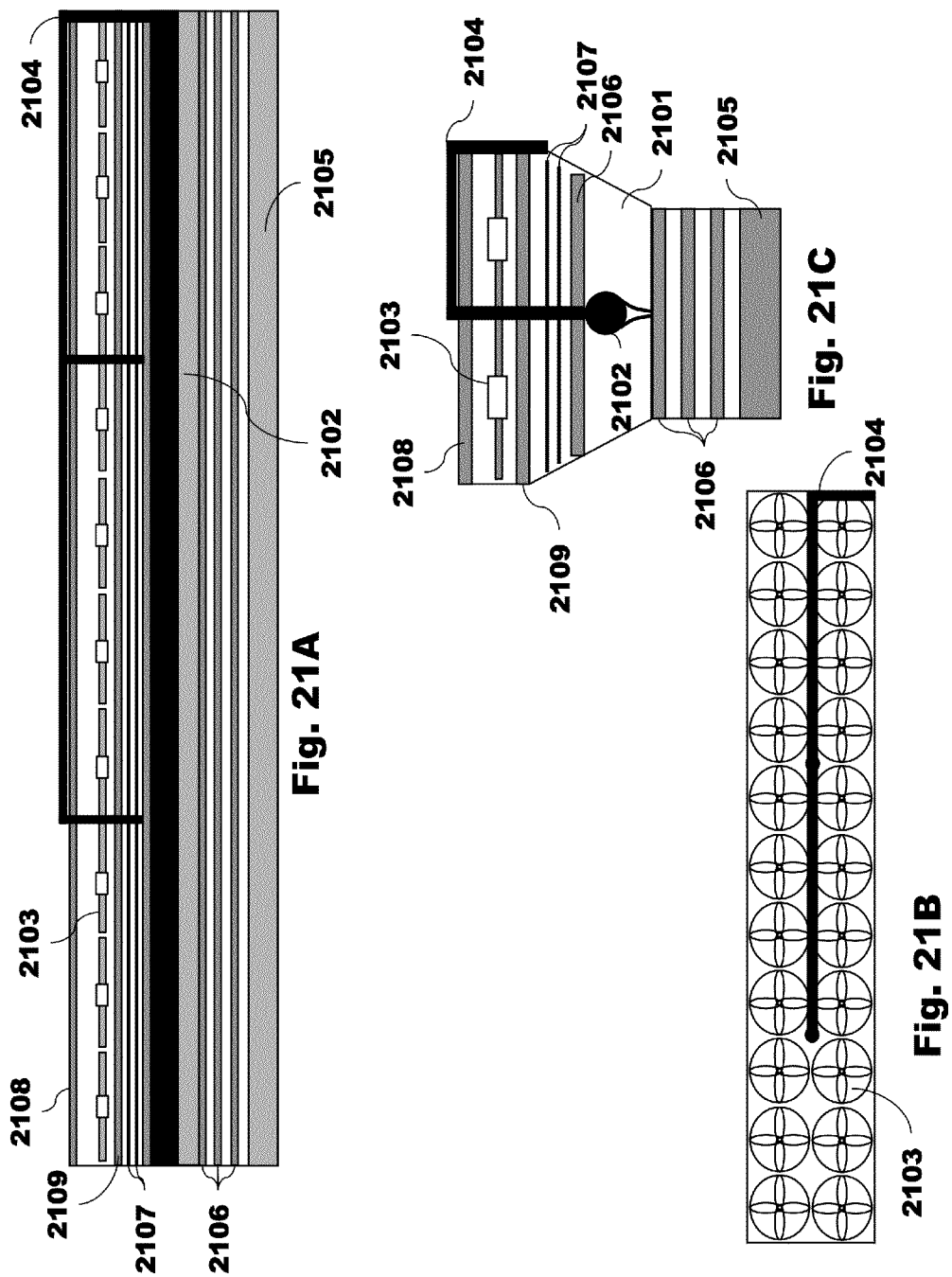

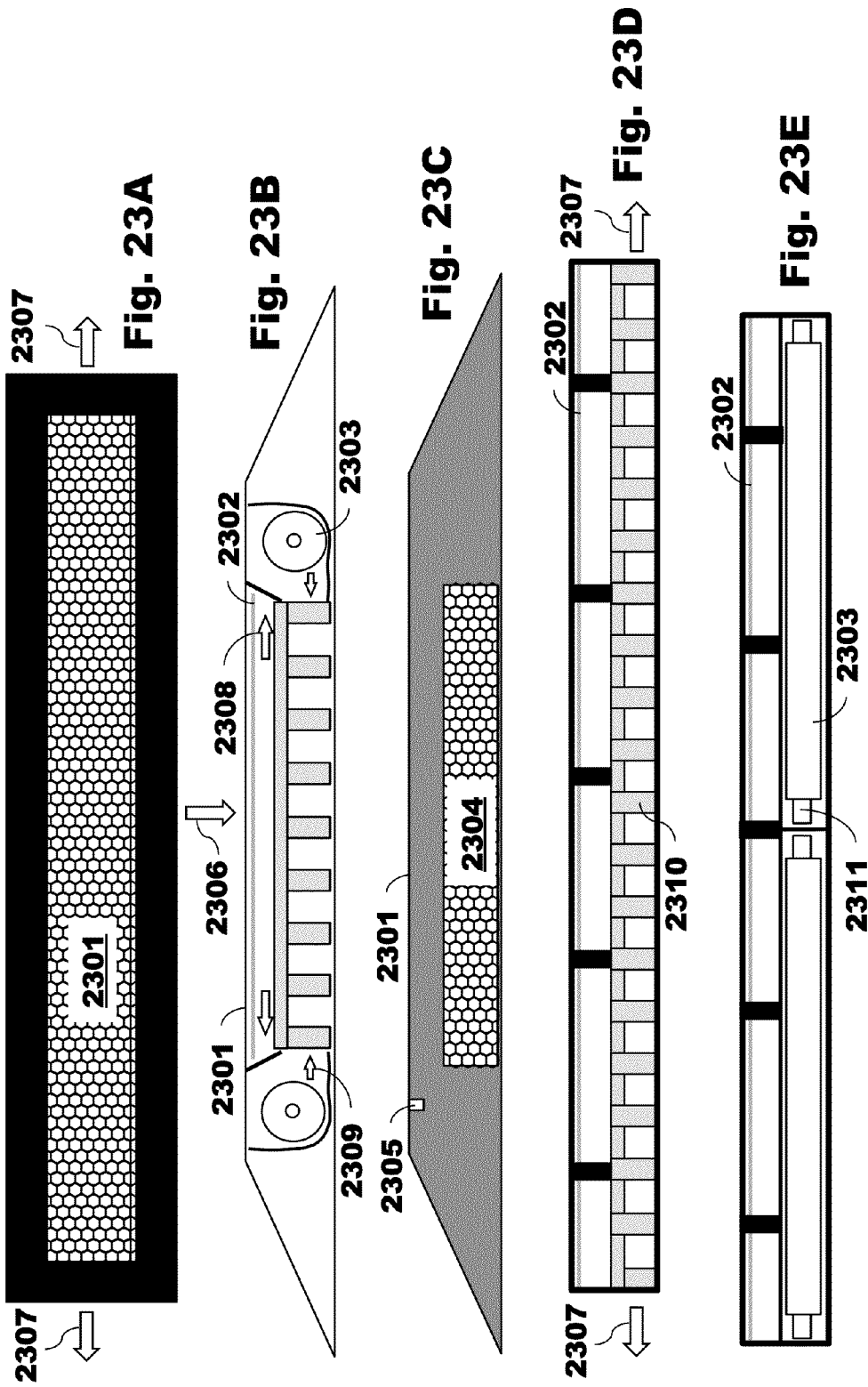

PROJECTION DISPLAY DEVICE WITH VAPOR MEDIUM SCREEN

CROSS-REFERENCE TO RELATED APPLICATIONS

This application claims priority from U.S. Provisional Patent Application 61/884,033 filed Sep. 28, 2013, U.S. Provisional Patent Application 61/923,926 filed Jan. 6, 2014, U.S. Provisional Patent Application 61/948,475 filed Mar. 5, 2014, and U.S. Provisional Patent Application 62/041565 filed Aug. 25, 2014, all of which are incorporated herein by reference.

FIELD OF THE INVENTION

The present invention relates generally to visual display devices. More specifically, it relates to a primarily air and low density vapor medium screen that may also allow for scent dispersal through the vapor screen medium, may efficiently use water, and comes in various display sizes, shapes, and orientations.

BACKGROUND OF THE INVENTION

Water, mist, fog, vapor, smoke and dust have been used as display mediums. The way light interacts, reflects and refracts off particulates is well known and documented. Devices were developed to somehow arrange these particulates into a display medium or screen. Different methods have been developed in the art in attempt to achieve this for their particular medium.

The existing approaches are multi-part systems, which can be made up of separate pieces of hardware such as: emitter, collector, projector and tank (containing the liquid form of the display medium, i.e., water). Descriptions of existing systems show methods for specific orientations of emission (horizontal, downward, upward) due to the design of the systems. The drawback of all these approaches is they were built as fixed devices and were not ready for the rigors of professional work environments.

In brief, existing vapor display systems suffer from one or more disadvantages such as lack of flexibility in display orientation, large water consumption, problems with vapor condensation, display image instability, low image resolution and poor image quality, lack of adaptability to specific environmental needs and/or user preferences, and difficulty with installation, maintenance, configuration, and repair.

SUMMARY OF THE INVENTION

In various aspects, the invention provides:
1) A method and apparatus to form discrete flows of air and vapor in a laminar flow to create a thin sheet of primarily air and low density vapor which reflects and refracts light from a source creating still or moving imagery on the laminar air and vapor medium.
2) An apparatus for forming discrete laminar flows of primarily air and low density vapor to be projected upon by a light source comprising of a single nozzle to supply vapor through a series of mesh and honeycomb grates to create the laminar flow. One or more fans pressurize the airbox and air travels through discrete sections of mesh and honeycomb to create laminar flow on both sides of the single nozzle. An expansion chamber with means of atomizing the water into a vapor form, which in the preferred embodiment is pressurized by a single fan. The mean particle diameter of the vapor particulate is approximately 15 microns and is less than 5% of the total air/vapor mixture.
3) An apparatus for forming discrete laminar flows of air and low density vapor taking shape of a display surface screen which light is cast upon from various devices, such as a projector, that is then refracted and reflected creating still and/or moving imagery on the vapor screen medium. The apparatus for creating said vapor screen is comprised of a water tank, expansion chamber, an airbox, and a power supply.
4) A 'self contained' apparatus and method for forming an air and vapor medium screen that also allows for scent dispersal through the vapor screen medium. The vapor medium acts as a carrier for discrete scents selected by a user through a physical button or virtual button or activator. Individual scents are deposited into the vapor screen medium via the nozzle, then carried out of the airbox and can be deposited onto an object in the vapor medium such as a users hand, arm, or wrist, or other object used to absorb the scent. The scent may also be dispensed directly to the environment, which can change the ambient smell of the surrounding area. Multiple scents can be used discretely.
5) A 'self contained' apparatus and method for forming a primarily air and low density vapor medium screen that also allows for scent dispersal through the air and vapor screen medium. The low density vapor medium is carried by large volumes of air supplied by one of more fans traveling through a series of honeycomb, tubular and square mesh layers as well as empty spaces between said layers, emitting from the face of the device in a laminar flow of primarily air and low density vapor provided from a single nozzle. In some embodiments with a smaller nozzle length of 12 inch an approximate usage of 500 ml/h will be used, for every additional 12 inch in nozzle length, approximately 500 ml/h of water will be required in addition, and will be provided by the systems within the relative embodiment.
6) A apparatus and method for forming a primarily air and low density vapor medium screen which is capable of transmitting and displaying various resolutions of content. A minimum resolution of 120×160 is supported but a resolution of 1920×1080 is recommended in most embodiments, though higher or lower resolutions may be used depending on content requirements.

One advantage of embodiments of the present invention is the modular nature of the components, allowing easy maintenance, repair, upgrades, or expansions by the end user.

The embodiments of the present invention referenced herein show methods for changing one embodiment to multiple orientations using the same modular parts and can be performed by the end user. This allows vastly increased installation opportunities for a single piece of hardware.

The embodiments of the invention mentioned herein are self-contained systems reduces complexity for the end user, eases transportation, ensures proper setup (i.e., projection angles) and reduces footprint of the installation.

In one aspect, the invention provides a device for forming a vapor display screen. The device includes a water tank for holding water, an expansion chamber for creating vapor, an airbox for creating a laminar flow of air and vapor, a projector for projecting light onto the vapor display screen, a computer for executing software that supplies display content to the projector, and a power supply unit. The airbox has an airbox fan that pressurizes and pushes air and vapor through the airbox, a series of mesh and honeycomb panels (preferably four layers) that equalize the pressure of the air and vapor pushed through the airbox, and a nozzle having a single nozzle opening for emitting a sheet of vapor and a main nozzle tube for carrying vapor from the expansion chamber, and a drain to allow condensation buildup to drain back into the water tank. The expansion chamber has a water-tight container, a module for creating water vapor from liquid water, a floating water level switch, a pump for adding water to the expansion chamber from the water tank, a blower fan to pressurize the expansion chamber, and a vapor outlet that connects to the nozzle within the airbox. The water tank has a water-tight container, a water input port, a water output port connected to the expansion chamber, a water drain port, a secondary water input from the nozzle drain, and water level indicator.

Preferably, the vapor consists of water droplets having mean diameters in the range from 10 microns to 20 microns, the laminar flow of air and vapor comprises between 1% and 5% water vapor.

Preferably, the series of mesh and honeycomb panels comprise alternating layers of mesh and honeycomb. The honeycomb panels preferably have hexagonal cells having between ⅛ inch and ¼ inch width, more preferably 3/16 inch width.

The device preferably has only a single nozzle. The nozzle width is preferably 3/16 inch.

In preferred embodiments, the device also includes a scent dispenser, and the airbox has a scent mist nozzle near the nozzle.

The power supply unit preferably has user-controllable potentiometers allowing the adjustment of output voltages supplied to different components of the device. For example, the output voltage adjustment may provide +/−15% variation in voltage. The potentiometers may allow control of the airbox fan speed and the blower fan speed, and other operational parameters to allow user control of vapor density, vapor flow speed, and airflow speed.

The device may include interactive input hardware executed by the computer.

During operation, the device consumes no more than 500 ml/h water for every 12 inch in nozzle length.

Preferably, the water tank, power supply unit, expansion chamber, airbox, computer, and projector, are modular components that can be replaced or re-oriented by an end user of the device.

The expansion chamber preferably has a modular design allowing it to change orientation, whereby the device may operate in different orientations.

Further advantages and features will be appreciated from the following figures and description.

BRIEF DESCRIPTION OF THE DRAWINGS

FIGS. 3A-B show views of an upright display water tank, according to an embodiment of the invention.

FIGS. 9A-B show views of a table-top water tank, according to an embodiment of the invention.

FIGS. 10A-B show views of a table-top airbox, according to an embodiment of the invention.

FIGS. 12A-B show views of a large format free-standing display vertical configuration, according to an embodiment of the invention.

FIGS. 13A-C show views of a large format free-standing display horizontal Configuration, according to an embodiment of the invention.

FIGS. 15A-C show views of a large format power supply unit, according to an embodiment of the invention.

FIGS. 19A-C show views of a jumbo format free-standing display, according to an embodiment of the invention.

FIGS. 21A-C show views of a jumbo format airbox, according to an embodiment of the invention.

FIGS. 23A-E show views of a vapor intake trough, according to an embodiment of the invention.

DETAILED DESCRIPTION

Figure 1:
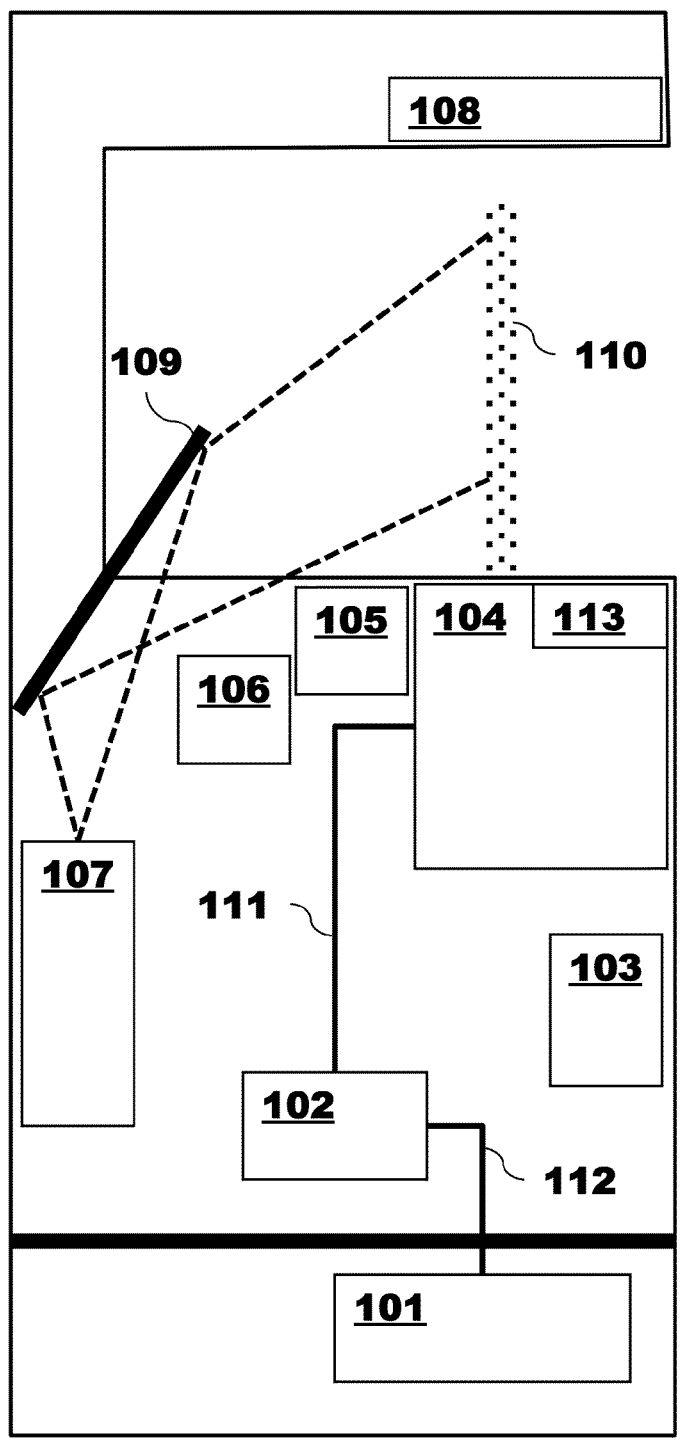
FIG. 1 is a schematic view of a self-contained upright display booth, according to an embodiment of the invention.
Figure 2A:
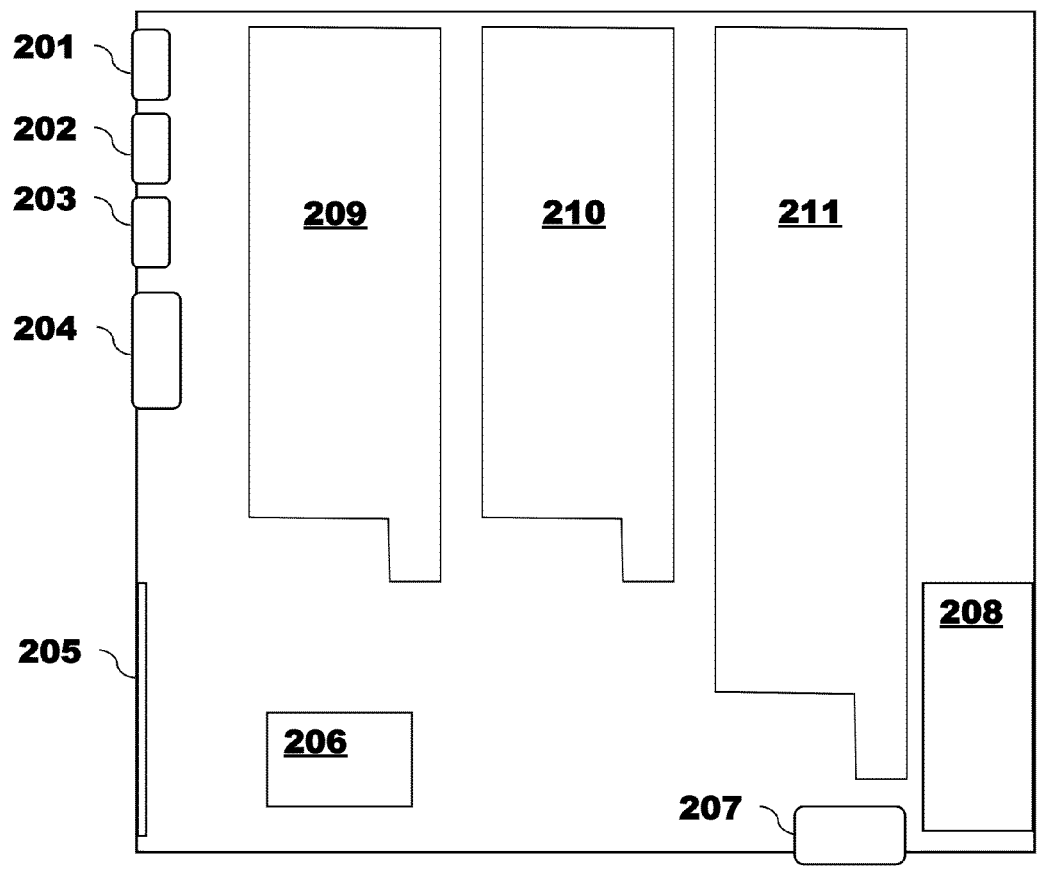
FIGS. 2A-D show views of an upright display power supply unit, according to an embodiment of the invention.
Figure 2B:
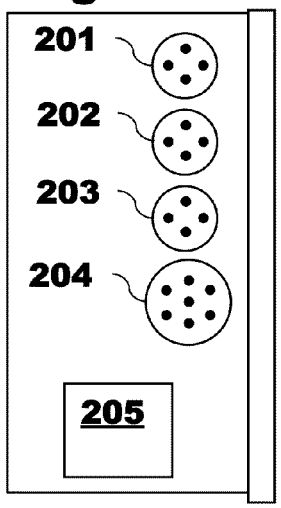
Figure 2C:
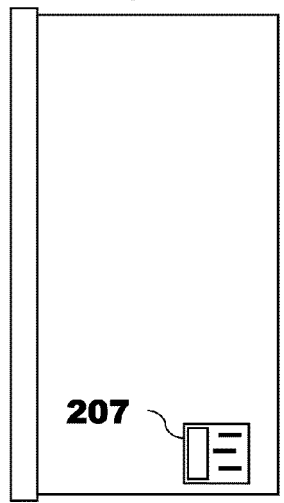
Figure 2D:
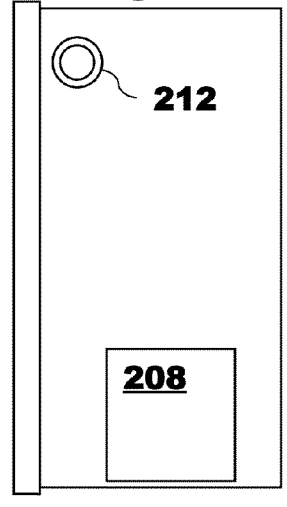

Embodiments of the invention provide a display device that is based on the use of vapor as a display screen medium. Light is projected onto the vapor screen medium via a light source such as a laser, LCD, or other type of projector to form visible, seemingly floating images on the vapor medium. The invention, as realized in at least one embodiment, is completely self-contained and needs only a power hookup and water to operate. In a preferred embodiment, no part of the apparatus is mounted externally as in similar products, such as the water tank, projector, mirror or CPU. In some embodiments, the apparatus is mobile and easily movable due to removable locking caster wheels that allow the apparatus to roll on smooth surfaces. In the preferred embodiment, the apparatus has an internal CPU that is used to supply content to the projector. In the preferred embodiment, the internal CPU operates the interactive software that uses input from the hand (or other) motion input device to allow users to control software and content by gesturing within the vapor screen using their hands or other physical objects. In the preferred embodiment, the software also allows remote control of the display, such as via RDP and VNC protocols, so content and software can be loaded remotely by connecting to the CPU ad hoc, directly, wirelessly or through a network. In some embodiments, the apparatus also has means for 'inhaling' its own vapor screen, thereby creating a cleaner appearance and reducing ambient humidity in the environment that the apparatus is being used, and in some embodiments improving the stability of the vapor display screen. When the vapor medium is 'inhaled' back into the device, benefits of the apparatus include significantly reduced chance of condensation and wetting on nearby objects, floors, ceilings, and walls, in contrast with the existing displays. In the preferred embodiment, the apparatus also uses air filtering to remove dust and debris from the air intake of the apparatus to decrease maintenance and cleaning. In some embodiments, the invention, as realized in at least one embodiment, is housed within a cabinet that is customizable with just about any material such as wood, ferrous or non-ferrous metals, plastics, fiber based materials, glass or some other workable material. In some embodiments, the assembly is housed within an upright, free-standing display booth that has a small footprint of less than 4 sq. ft., which allows it to be placed in many locations in which similar displays cannot be used.

The following definitions are used within the present description:

A water tank is comprised of a physical water-tight container, a water input for filling, a water output to the expansion chamber, a water drain, a secondary water input from the nozzle contained within the airbox, and a water level indicator.

An expansion chamber is comprised of a physical water-tight container, a module for atomizing liquid water into vapor, a floating water level switch or floating water level apparatus, a pump for adding water to the expansion chamber from the water tank, a fan to pressurize the expansion chamber, and a vapor outlet that connects to the nozzle within the airbox.

An airbox is comprised of an enclosure which houses the airbox internals, a nozzle, Fans that pressurize and push air through the airbox, a series of mesh and honeycomb panels that equalize the pressure of the vapor from the nozzle, and equalize the pressure of the air current created by the airbox fans. The airbox can work in a horizontal or vertical orientation, as well as an upside-down horizontal configuration.

A nozzle is comprised of a single nozzle opening from which the sheet of vapor is emitted, a main nozzle tube that the vapor is pushed into via the expansion chamber, and a drain to allow condensation buildup to drain back into the water tank.

A CPU is a computer, such as a PC running the Microsoft Windows 8 operating system. The PC may supply content to the projector. The PC may also run the software necessary to operate the interactive input hardware installed, such as the Leap Motion controller hardware.

A scent dispenser is a device that contains one or more scents in discrete containers. Upon user interaction with the corresponding physical or virtual button or activator, or based on the content on the CPU, or some other input device or sensor or control, a scent will be transformed into a mist or vapor and deposited into the vapor stream within the nozzle.

Vapor used herein is a mixture of gas and liquid phases, where the liquid phase is in the form of suspended droplets in air.

Upright Display Unit

The device (FIG. 1) is a self-contained, upright display and is composed of modular internal parts: the water tank 101, the expansion chamber 102, the power supply unit (PSU) 103, the airbox 104, the scent dispenser 105, the CPU 106, the projector 107, the exhaust fan 108, the mirror 109, and the vapor hose 111. During operation, the vapor medium screen 110 is produced for displaying images from the projector. Water is supplied from the water tank 101 to the expansion chamber 102 via the water input hose 112 by means of a water pump housed inside of the expansion chamber 102.

The projector 107 beams light onto the surface of the mirror 109, which is then reflected onto the vapor medium screen 110. The exhaust fans 108 suck the excess vapor 110 into the body of the device (FIG. 1) The CPU 106 supplies content, using its software, to the projector 107. A hand position sensor 113, such as Leap Motion controller or Microsoft Kinect, is mounted within the box, preferably in front of the vapor medium screen 110, to provide input to the CPU 106 for controlling the projector 107 output.

The upright display unit is designed to create an image approximately 15 inches in diagonal, although smaller or larger displays are also possible, and emits approximately 750 ml/h of fluid.

In the embodiments for a upright display booth (FIG. 1), the display unit can be outfitted with an integrated Leap Motion 113 interface or alternative device for detecting hand or other object movements, which allows the user(s) to input commands to the CPU 106 via a USB cable or equivalent cable or wirelessly. Software, which may be customized or provided with the hardware, is loaded onto the CPU 106 and is manipulated by a user entering their hand, or other object into the vapor medium space 110 and making gestures. This interface can give a user control over the software without touching any physical screen, mouse, keyboard, or other physical peripheral. The software can have gesture controlled features, such as moving through a image or video slideshow, zooming in/out on content, activating buttons or switches, cursor control, left/right click functionality, or comparable functionality.

Figure 6:
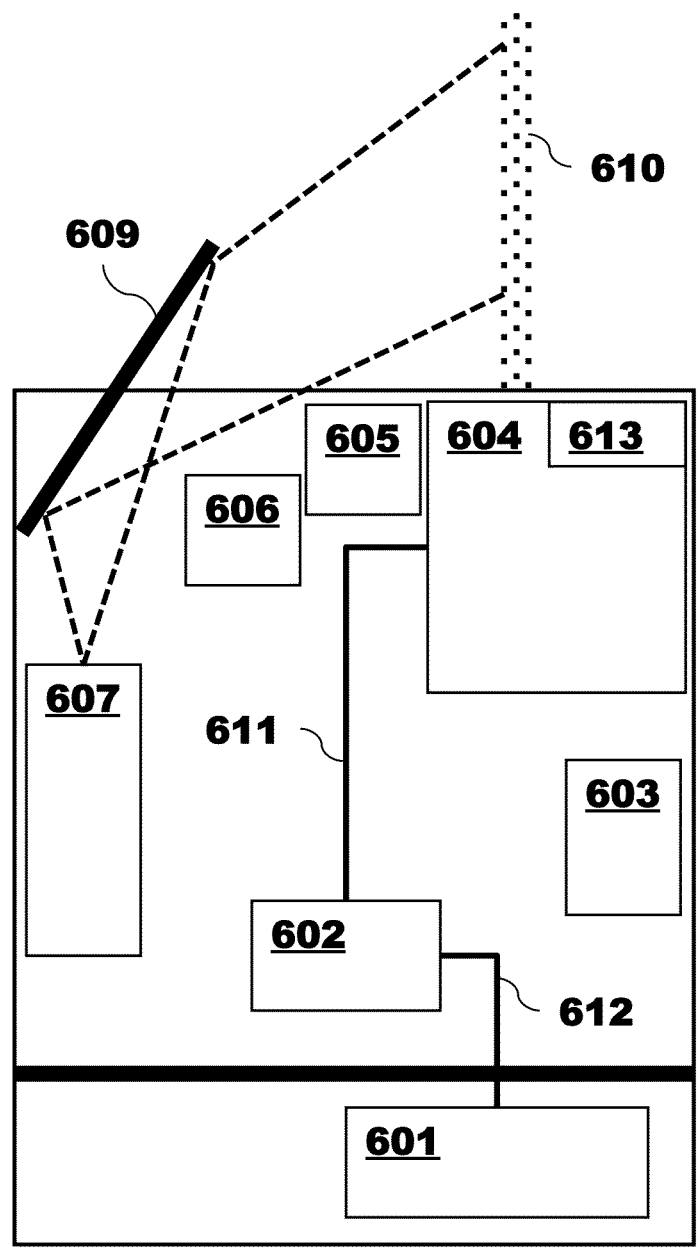
FIG. 6 show views of a self-contained upright display booth with no canopy, according to an embodiment of the invention.

In the embodiments for an upright display pedestal (FIG. 6), the device is a self-contained, upright display and is composed of modular internal parts: the water tank 601, the expansion chamber 602, the PSU 603, the airbox 604, the scent dispenser 605, the CPU 606, the projector 607, the mirror 609, the vapor medium screen 610), and the vapor hose 611.

The projector 607 beams light onto the surface of the mirror 609, which is then reflected onto the vapor medium screen 610. The exhaust fans 608 suck the excess vapor 610 into the body of the device (FIG. 6) The CPU 606 supplies content, using its software, to the projector 607. A hand position sensor 613, such as Leap Motion controller or Microsoft Kinect, is mounted within the box, preferably in front of the vapor medium screen 610, to provide input to the CPU 606 for controlling the projector 607 output.

The display unit can be outfitted with an integrated Leap Motion 613 interface or alternative device for detecting hand or other object movements, which allows the user(s) to input commands to the CPU 606 via a USB cable or equivalent cable or wirelessly. Software, which may be customized or provided with the hardware, is loaded onto the CPU 606 and is manipulated by a user entering their hand, or other object into the vapor medium space 610 and making gestures. This interface can give a user control over the software without touching any physical screen, mouse, keyboard, or other physical peripheral. The software can have gesture controlled features, such as moving through a image or video slideshow, zooming in/out on content, activating buttons or switches, cursor control, left/right click functionality, or comparable functionality.

Water is supplied from the water tank 101 to the expansion chamber 602 via the water input hose 612 by means of a water pump housed inside of the expansion chamber 602.

Additional features of both the upright display pedestal and upright display booth embodiments follow.

The device can be powered by voltage ranging from 80-260 V, though most locations will offer either 110 V or 220 V. The only other supply needed to run the device is water, although scents may also be provided. Water is inserted into the water tank (FIGS. 3A-B) via the water intake 305 to the desired fullness as represented by the water level 302. If ever the water tank needs to be drained of water, for transportation or storage, you place a supplied drain hose into the drain valve 303.

Figure 5A:
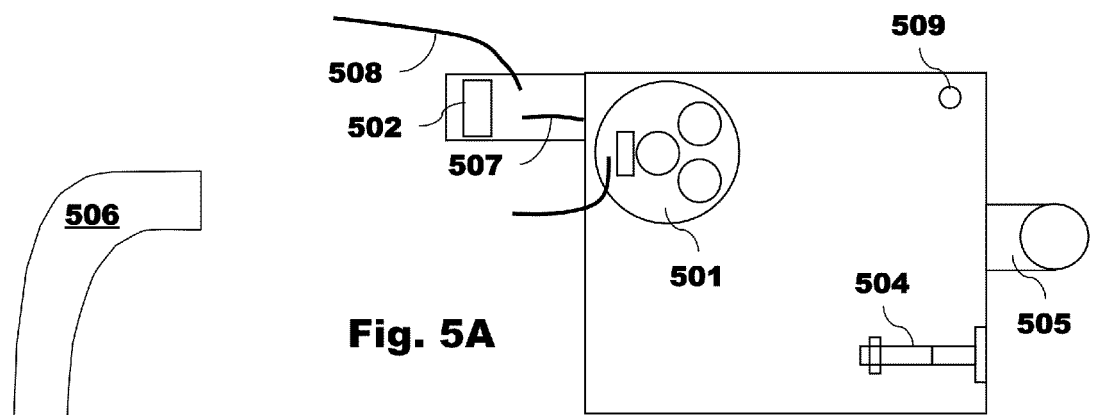
FIGS. 5A-C show views of an upright display expansion chamber, according to an embodiment of the invention.
Figure 5B:
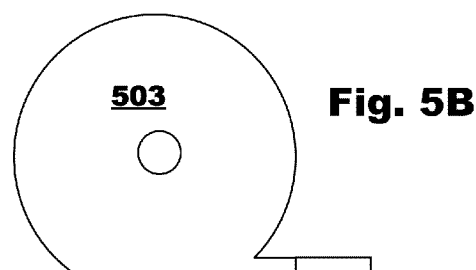
Figure 5C:
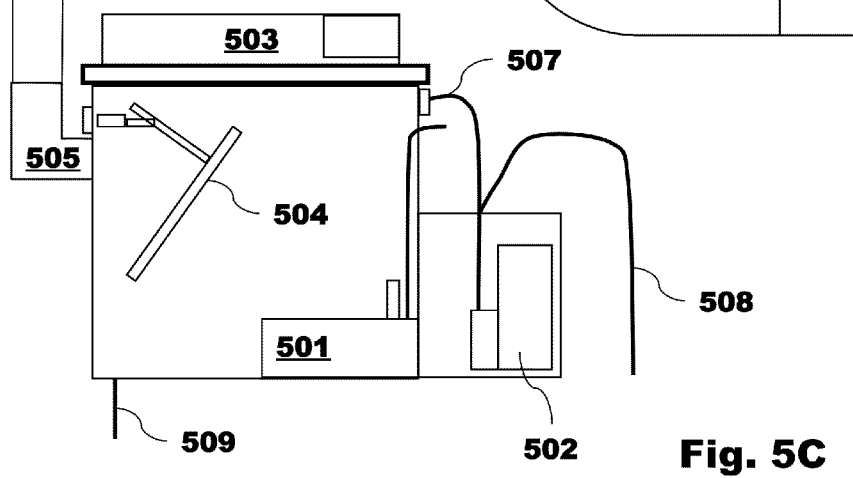

To power on the device, one must first plug it in to a power source via the power supply unit (PSU) (FIGS. 2A-D) power plug input 207, which plug may also house a fuse. You then turn the device on by flipping the power switch 212. Once the device is on, the unit will begin to startup by first pulling water from the water tank (FIGS. 3A-B) via the expansion chamber (FIGS. 5A-C) pump 502. The water is pulled through a tube 508 connected to the water tank's water output 304 and into the water input of the expansion chamber 507. Water will continue to fill the expansion chamber (FIGS. 5A-C) until the water lifts the float switch 504 to the open circuit position, thus cutting voltage to the pump 502, and shutting off the flow of water. At this time, the ultrasonic emitter 501 will have approximately the optimal level of water above it to create the vapor medium. The expansion chamber (FIGS. 5A-C) is pressurized by the blower fan 503, which causes the vapor to exhaust through the vapor output 505 and through the vapor hose 506 into the vapor input of the airbox 406. In the event the expansion chamber (FIGS. 5A-C) needs to be drained of water for transportation or storage, water can be drained via the expansion chamber drain valve 509 and is carried through a tube back into the water tank drain input 301.

Figure 4A:
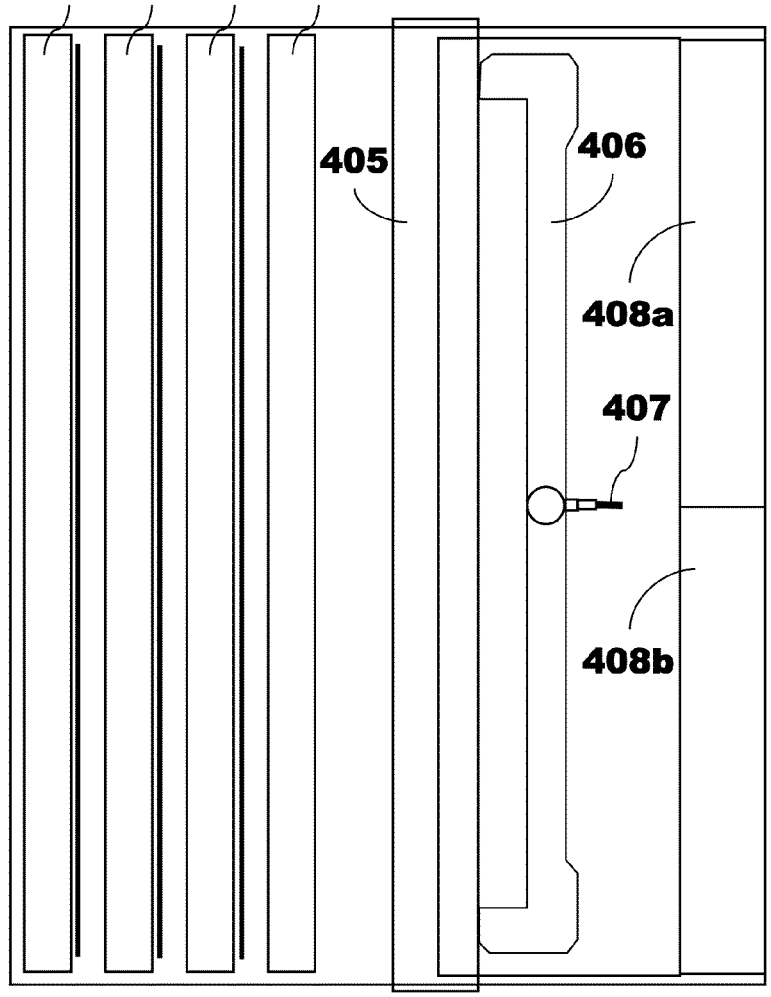
FIGS. 4A-B show views of an upright display airbox, according to an embodiment of the invention.
Figure 4B:
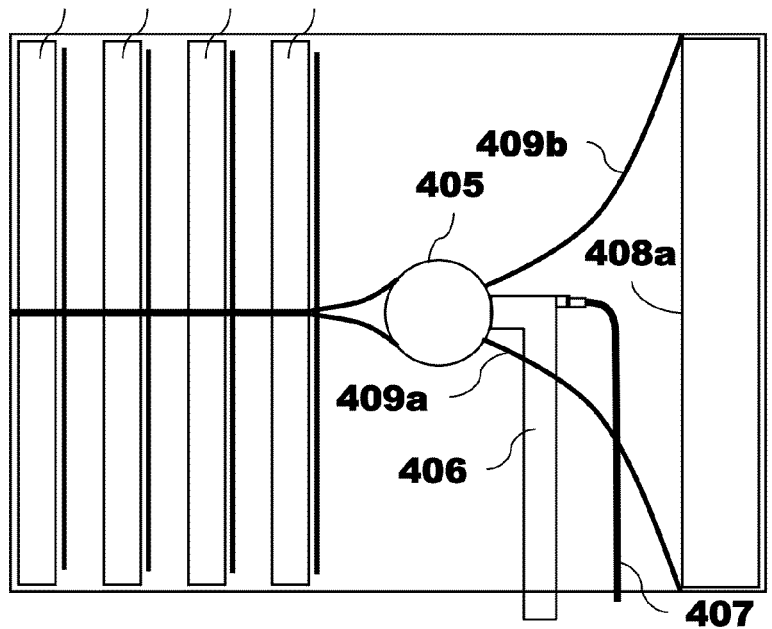

As vapor enters the airbox (FIGS. 4A-B) via the vapor input 406, the vapor flows into the nozzle 405. Due to the pressure that is applied to the vapor, the vapor then exhausts from the nozzle 405 through (in the preferred embodiment) four layers of honeycomb paneling (404, 403, 402, and 401) and then out of the top of the airbox (FIGS. 4A-B). As vapor collects within the nozzle 405, condensation is bound to occur. The resulting water is drained through the nozzle drain 407 by gravity and back into the water tank through the water tank drain input 301. The vapor medium exhausted by the nozzle 405 is supported by layers of air pressure on both sides; these are supplied by the airbox fans (408*a*, 408*b*). The airflow from the airbox fans (408*a*, 408*b*) first pass through sheets of mesh screen (409*a*, 409*b*) to even out air turbulence and pressure, the airflow then passes through the first layer of honeycomb 404 which has sheets of mesh 410 attached on both sides of the nozzle. The air continues on through another layer of honeycomb 403 then another layer of mesh 410 and honeycomb 402 and finally through a final layer of honeycomb 401. These layers of honeycomb even out turbulence and pressure from the airflow resulting in a laminar flow of air that acts as barriers guiding the vapor medium that is exhausted from the nozzle 405 in a flat and straight form.

Figure 18:
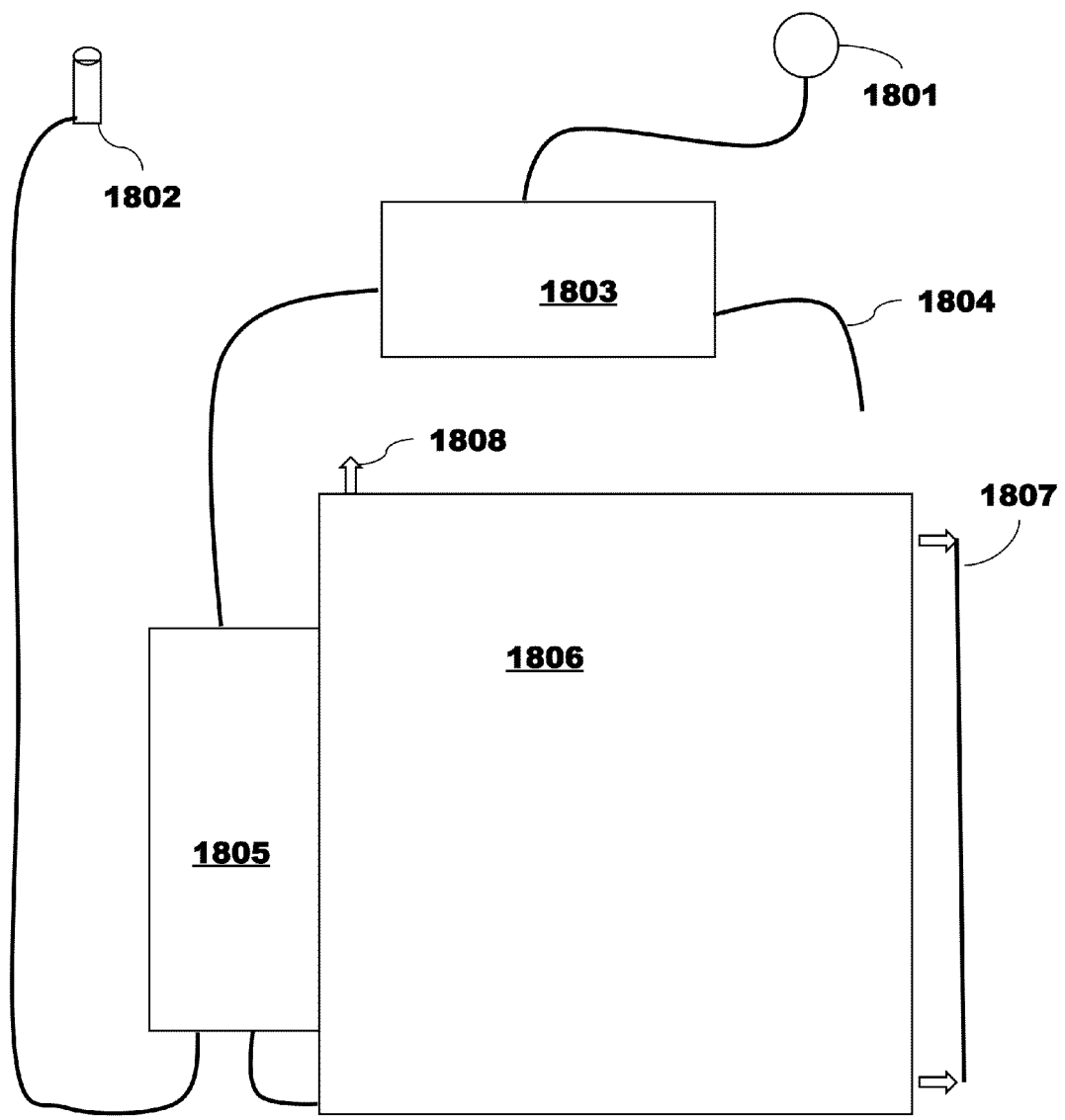
FIG. 18 shows a view of a perfume dispenser, according to an embodiment of the invention.

Another feature of the device is the ability to selectively dispense one or more scents carried in liquid form, by vaporizing, misting, or creating an aerosol from the scent and depositing it into the airbox near to the nozzle. The Scent dispenser (FIG. 18) is attached to the front side of the airbox (FIGS. 10A-B). In the preferred embodiment, the scent reservoir 1806 can be filled with the scent carrying fluid via the fill port 1808. When the scent dispenser's sensor 1801 in the airbox is activated, the connection for the scent pump 1805 will momentarily pull the scent fluid from the reservoir and be forced out of the fluid output tube to the mist nozzle located in the airbox 1802, 1004. There can be more scent dispensers than one, and the scents can be dispensed in combination or individually, and the amount of a scent dispensed at any one time may vary. The scents may be dispensed based on user input (such as through the Leap Motion controller or other input device, internal to the device or externally located), or based on the content on the CPU, or through some other mechanism, such as a physical button.

In the preferred embodiment, to receive a scent from the scent dispenser, a user enters an object (such as their hand) over the proximity sensor 1801, which momentarily sends a positive voltage to the pump 1805, which then pulls the liquid from the reservoir for spraying through the scent nozzle. Two of the jumper cables 1804 are connected to a power supply, such as in FIG. 8. The scent dispenser receives from the power supply (FIG. 8) via the power input 1804, which powers the printed circuit board (PCB) 1803, which in turn runs the firmware to operate the proximity sensor 1801. One of skill in the art can readily understand alternative means for providing input to the pump 1805 from the sensor 1801, including mechanical connections, electrical or electronic connections, externally located sensors, and control as directed by or from or in synchrony with the content being displayed, or through timing or other control means. The scent reservoir may have a level 1807 for determining how full the reservoir is.

In an alternative embodiment, the other features as described may be constructed without a scent dispensing feature being included.

All of the components inside the device are supplied power by the power supply unit (PSU) (FIGS. 2A-D). The PSU takes external supply voltage, typically 110 V-220 V, via the power plug input 207 and distributes that voltage to the input of each of the three internal power supplies (209, 210, 211). An internal power supply 209 steps down and converts the voltage to provide (in the preferred embodiment) 12 V dc to the airbox PSU connector 201, the exhaust fan 108 power connector 202, and to the 3 V dc step down 206, which in turn connects to the expansion chamber power connector 204. Internal power supply 210 steps down and converts the supply voltage to provide 12 V dc to the expansion chamber power connector 204, which powers the Blows fan. From the line level input terminal of internal power supply 210, a jumper is installed connecting to projector 107 power output 203. Internal power supply 211 steps down and converts the supply voltage to 24 V dc and connects to the expansion chamber power connector 204 powering the ultrasonic module 501. The PSU (FIGS. 2A-D) also has an exhaust fan 208 and a dust screen on the air input 205 to keep temperatures down.

Table-Top Display Unit

The table-top display unit is designed to create an image approximately 30 inches in diagonal, although smaller or larger displays are also possible, and emits approximately 1250 ml/h of fluid.

In the embodiments for the table-top display unit (FIG. 7), the display unit can be outfitted with an integrated motion detecting device Leap Motion 708 interface or alternative device for detecting hand or other object movements, which allows the user(s) to input commands to the CPU 705 via a USB cable or equivalent cable or wirelessly. Software, which may be customized or provided with the hardware, is loaded onto the CPU 705 and is manipulated by a user entering their hand, or other object into the vapor medium space and making gestures. This interface can give a user control over the software without touching any physical screen, mouse, keyboard, or other physical peripheral. The software can have gesture controlled features, such as moving through a image or video slideshow, zooming in/out on content, activating buttons or switches, cursor control, left/right click functionality, or comparable functionality.

Water is supplied from the water tank 701 to the expansion chamber 704 via the water input hose by means of a water pump housed inside of the expansion chamber 704.

The device can be powered by voltage ranging from 80-260 V, though most locations will offer either 110 V or 220 V. The only other supply needed to run the device is water, although scents may also be provided. Water is inserted into the water tank (FIGS. 9A-B) via the water intake 901 to the desired fullness as represented by the water level 906.

When the water tank needs to be drained of water, such as for transportation or storage, one can place a supplied drain hose into the drain valve 904.

Figure 11A:
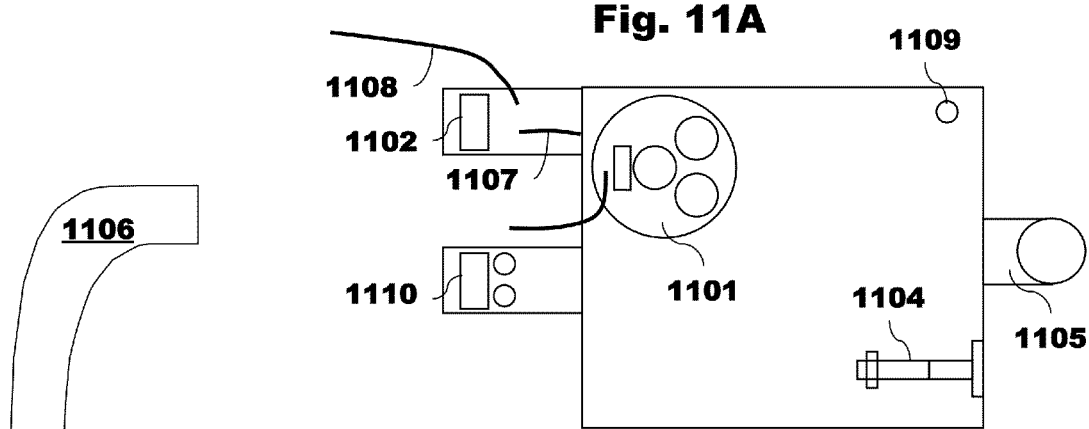
FIGS. 11A-C show views of a table-top expansion chamber, according to an embodiment of the invention.
Figure 11B:
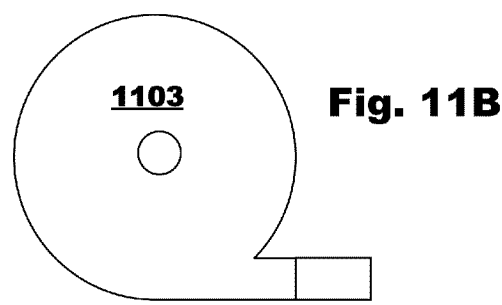
Figure 11C:
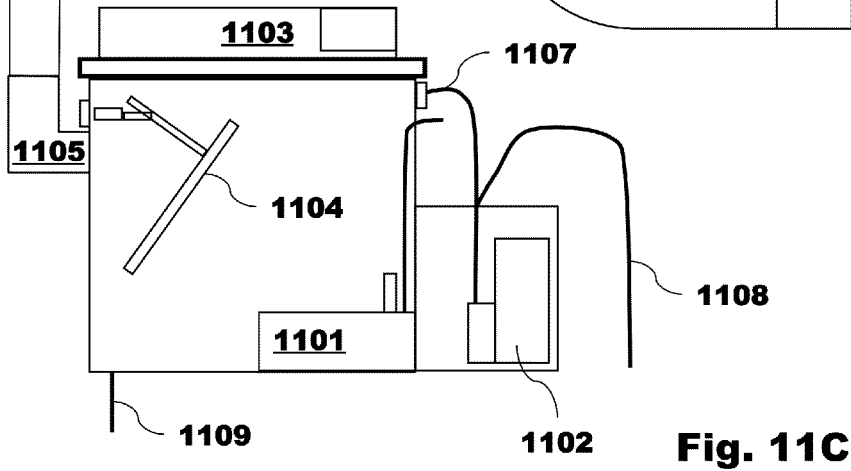

To power on the device, the device is connected, by a plug or other wired connection, to a power source via the power supply unit (PSU) (FIG. 8) power plug input 806, which plug may also house a fuse. You then turn the device on by flipping the power switch 805. Once the device is on, the unit will begin to startup by first pulling water from the water tank (FIGS. 9A-B) via the expansion chamber (FIGS. 11A-C) pump 1102. The water is pulled through a tube 1108 connected to the water tank's water output 902 and into the water input of the expansion chamber 1107. Water will continue to fill the expansion chamber (FIGS. 11A-C) until the water lifts the float switch 1104 to the open circuit position, thus cutting voltage to the pump 1102, and shutting off the flow of water. At this time, the ultrasonic emitter 1101 will have the optimal level of water above it to create the vapor medium. The expansion chamber (FIGS. 11A-C) is pressurized by the blower fan 1103, which causes the vapor to exhaust through the vapor output 1105 and through the vapor hose 1106 into the vapor input of the airbox 1002. In the event the expansion chamber (FIGS. 11A-C) needs to be drained of water for transportation or storage, water can be drained via the expansion chamber drain valve 1109 and is carried through a tube back into the water tank drain input 905.

As vapor enters the airbox (FIGS. 10A-B) via the vapor input 1002, the vapor flows into the nozzle 1001. Due to the pressure that is applied to the vapor, the vapor then exhausts from the nozzle 1001 through (in the preferred embodiment) four layers of honeycomb 1005, 1006, 1007, 1008, though fewer layers or more layers may be used, and then out of the top of the airbox (FIGS. 10A-B). As vapor collects within the nozzle 1001, condensation may occur. Condensate water is drained through the nozzle drain 1004 by gravity or pump, and back into the water tank through the water tank drain input 903. The vapor medium exhausted by the nozzle 1001 is supported by layers of air pressure on both sides; these are supplied by the airbox fans 1003. The airflow from the airbox fans 1003 first pass through sheets of mesh screen to even out air turbulence and pressure, the airflow then passes through the first layer of honeycomb 1008 which has sheets of mesh attached on both sides of the nozzle. The air continues on through another layer of honeycomb 1007 then another layer of mesh and honeycomb 1006 and finally through a final layer of honeycomb 1005. These layers of honeycomb even out turbulence and pressure from the airflow resulting in a laminar flow of air that acts as barriers guiding the vapor medium that is exhausted from the nozzle 1001 in a flat and straight form.

Another feature of the device is the ability to selectively dispense one or more scents carried in liquid form, by vaporizing, misting, or creating an aerosol from the scent and depositing it into the airbox near to the nozzle. The Scent dispenser (FIG. 18) is attached to the front side of the airbox (FIGS. 10A-B). In the preferred embodiment, the scent reservoir 1806 can be filled with the scent carrying fluid via the fill port 1808. When the scent dispenser's sensor 1801 in the airbox is activated, the connection for the scent pump 1805 will momentarily pull the scent fluid from the reservoir and be forced out of the fluid output tube to the mist nozzle located in the airbox 1802, 1004. There can be more scent dispensers than one, and the scents can be dispensed in combination or individually, and the amount of a scent dispensed at any one time may vary. The scents may be dispensed based on user input (such as through the Leap Motion controller or other input device, internal to the device or externally located), or based on the content on the CPU, or through some other mechanism, such as a physical button.

In the preferred embodiment, to receive a scent from the scent dispenser, a user enters an object (such as their hand) over the proximity sensor 1801, which momentarily sends a positive voltage to the pump 1805, which then pulls the liquid from the reservoir for spraying through the scent nozzle. Two of the jumper cables 1804 are connected to a power supply, such as in FIG. 8. The scent dispenser receives from the power supply (FIG. 8) via the power input 1804, which powers the printed circuit board (PCB) 1803, which in turn runs the firmware to operate the proximity sensor 1801. One of skill in the art can readily understand alternative means for providing input to the pump 1805 from the sensor 1801, including mechanical connections, electrical or electronic connections, externally located sensors, and control as directed by or from or in synchrony with the content being displayed, or through timing or other control means. The scent reservoir may have a level 1807 for determining how full the reservoir is.

In an alternative embodiment, the other features as described may be constructed without a scent dispensing feature being included.

Figure 8:
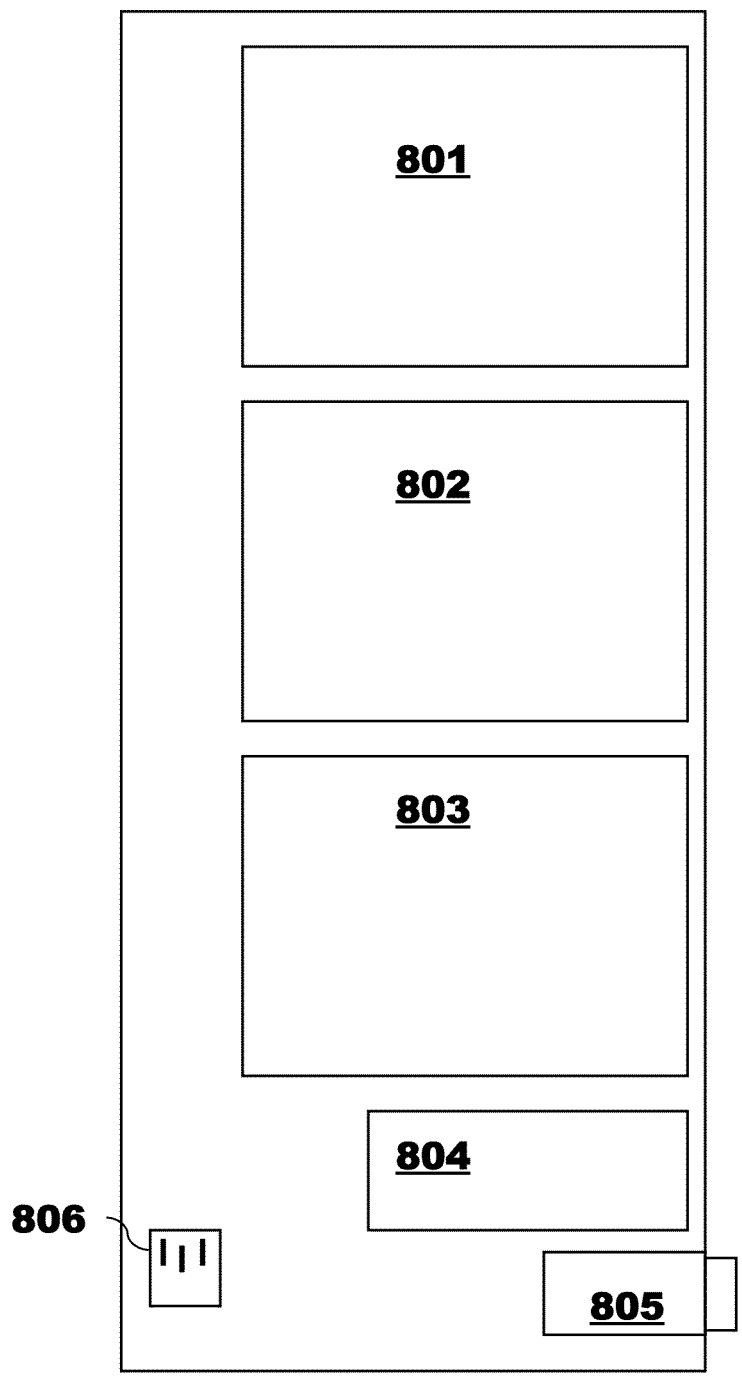
FIG. 8 shows a view of a table-top power supply unit, according to an embodiment of the invention.

All of the components inside the device are supplied power by the power supply unit (PSU) (FIG. 8). The PSU takes external supply voltage, typically 110 V-220 V, via the power plug input 806, which may be a detachable or permanently connected power cord or an alternative connection to a power source, and distributes that voltage to the input of each of the three internal power supplies (801, 802, 803) Whereas the fourth power supply 804 receives operational voltage from power supply 801 or another source. One internal power supply steps down and converts the voltage to provide (in the preferred embodiment) 12 V dc to the airbox (FIG. 10) to the fans 1003. Internal power supply 802 steps down and converts the supply voltage to provide 12 V dc to the expansion chamber (FIGS. 11A-C), which powers the blower fan 1103. From the line level input terminal of internal power supply 802, a jumper is installed connecting line level power to the projector 802, as well as a separate jumper providing line level power to the CPU 805. Internal power supply 803 steps down and converts the supply voltage to 24 V dc and connects to the expansion chamber powering the ultrasonic module 1101. The fourth power supply 804 provides 5 V dc to the ultra pump 1102 as well as the condensation pump 1110, which pulls water that is a product of condensation within the nozzle 1001 via the nozzle drain 1004. The quantity and voltages supplied by the power supply unit may vary depending on the requirements of the components being supplied with power, as would be readily understood by one skilled in the art. Alternative components requiring power may be substituted with other parts with differing power requirements.

The device (FIG. 7) is a self-contained display unit and is composed of modular internal parts: the water tank 701, the expansion chamber 704, the PSU 706, the airbox 707, optionally the scent dispenser 708, the CPU 705, the projector 707, the mirror 703, and optionally the Leap Motion (or alternative motion detecting) device 708.

The projector 702 beams light onto the surface of the mirror 703, which is then reflected onto the vapor screen medium. The CPU 705 supplies content, using its software, to the projector 702. In the preferred embodiment, a hand position sensor 708, such as Leap Motion controller or Microsoft Kinect, is mounted within the box, preferably in front of the vapor medium screen, to provide input to the CPU 705 for controlling the projector 702 output. Alternatively, an external sensor may provide input to the CPU 705. In an alternative embodiment, the CPU is located externally, or the content is otherwise provided from an external source through a video connection, or a network connection, wired or wireless connection, or fiber option connection.

Large Format Vertical Display Unit

The large format vertical display unit is designed to create an image approximately 80 inches in diagonal, although smaller or larger displays are also possible, and emits approximately 3 liters/hour of fluid.

In the embodiments of the large format vertical display, the device can be powered by voltage ranging from 80-260 V, though most locations will offer either 110 V or 220 V. The only other supply needed to run the device is water, although scents may also be provided.

Figure 16A:
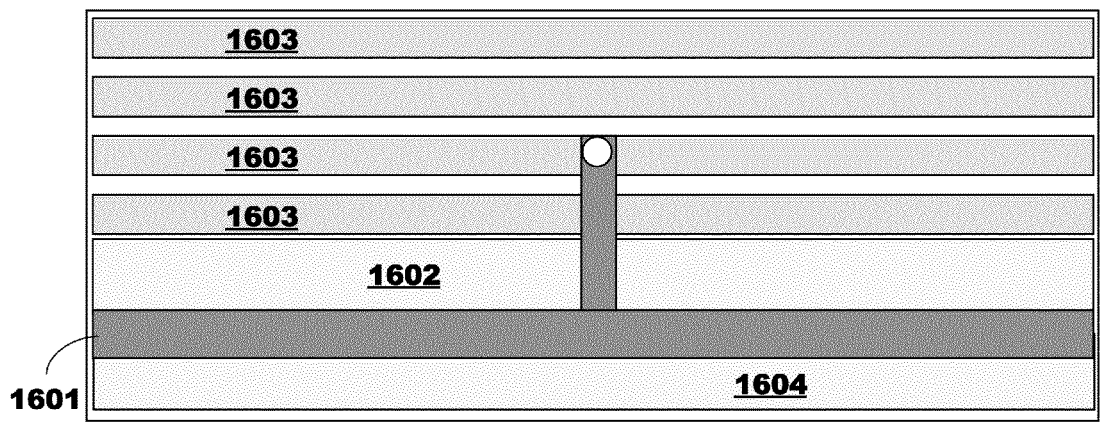
FIGS. 16A-B show views of a large format airbox, according to an embodiment of the invention.
Figure 16B:
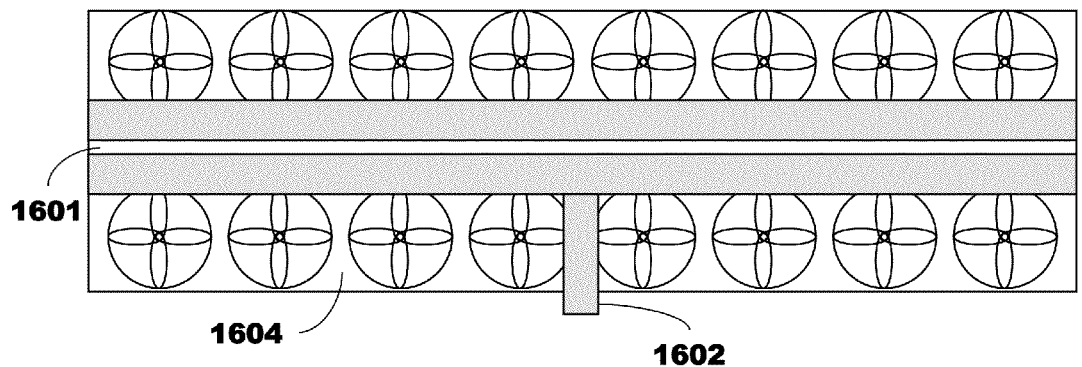
Figure 17C:
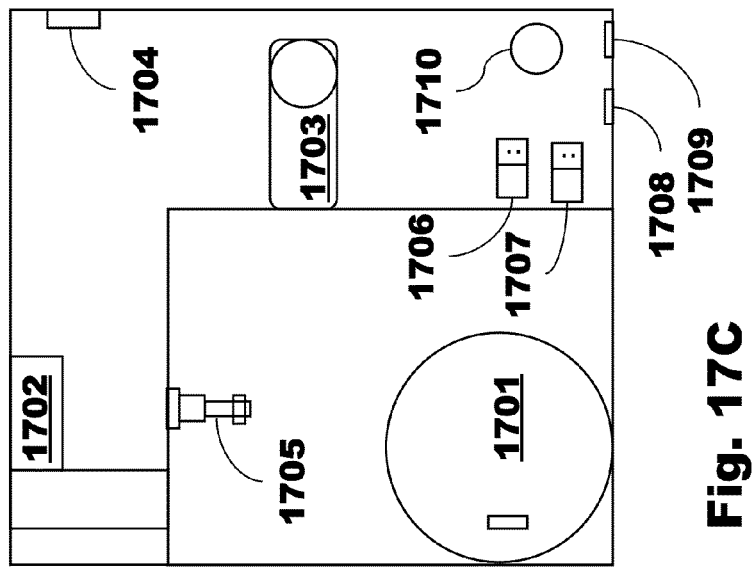
FIGS. 17A-C show views of a large format expansion chamber, according to an embodiment of the invention.
Figure 17A:
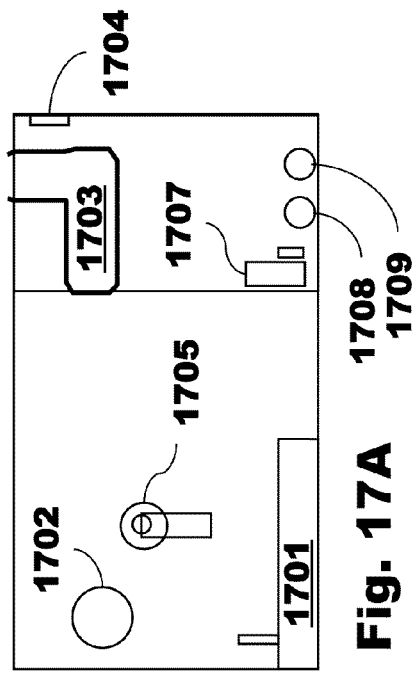
Figure 17B:
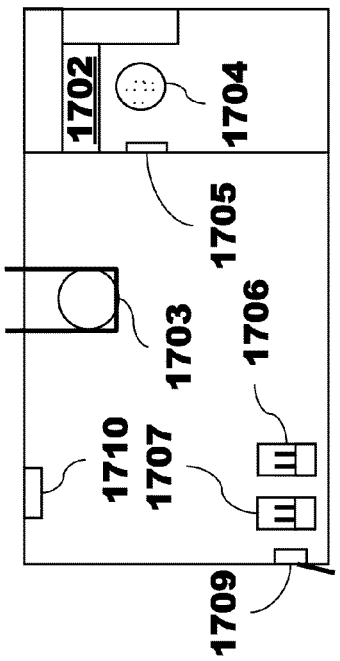

To power on the device, one must first plug it in to a power source via the power supply unit (PSU) (FIGS. 15A-C) power plug input 1512, which plug may also house a fuse. You then turn the device on by flipping the power switch 1511. Once the device is on, the unit will begin to startup by first pulling water from the water tank via the expansion chamber (FIGS. 17A-C) pump 1707. The water is pulled from an external water tank and into the expansion chamber (FIGS. 17A-C) via the water input valve 1708. Water will continue to fill the expansion chamber (FIGS. 17A-C) until the water lifts the float switch 1705 to the open circuit position, thus cutting voltage to the pump 1707, and shutting off the flow of water. At this time, the ultrasonic emitter 1701 will have the optimal level of water above it to create the vapor medium. The expansion chamber (FIGS. 17A-C) is pressurized by the blower fan 1702, which causes the vapor to exhaust through the vapor output 1703 and into the 1203, of the airbox (FIGS. 16A-B). In the event the expansion chamber (FIGS. 13A-C) needs to be drained of water for transportation or storage, water can be drained via the expansion chamber drain valve 1709.

Vapor enters the airbox (FIGS. 16A-B) via the nozzle 1203. Due to the pressure that is applied to the vapor, the vapor then exhausts from the nozzle 1203 through (in the preferred embodiment) five layers of honeycomb, though fewer layers or more layers may be used (1204) and then out of the exit of the airbox (FIGS. 16A-B). As vapor collects within the nozzle 1203, condensation is bound to occur. The resulting water is drained through the bottom of the nozzle 1203 by gravity or pump, and back into the expansion chamber 1205 (FIGS. 17A-C) through the nozzle 1203. The vapor medium exhausted by the nozzle 1203 is supported by layers of air pressure on both sides; these are supplied by the airbox fans 1202. The airflow from the airbox fans 1202 first pass through sheets of mesh screen to even out air turbulence and pressure, the airflow then passes through the first layer of honeycomb 1204 which has sheets of mesh attached on both sides of the nozzle. The air continues on through another layer of honeycomb 1204 then another layer of mesh and honeycomb 1204 and finally through a final layer of honeycomb 1204 and more or less depending on the embodiment. These layers of honeycomb even out turbulence and pressure from the airflow resulting in a laminar flow of air that acts as barriers guiding the vapor medium that is exhausted from the nozzle 1203 in a flat and straight form.

All of the components inside the device are supplied power by the power supply unit (PSU) (FIGS. 15A-C). The PSU takes external supply voltage, typically 110 V-220 V, via the power plug input 1512 and distributes that voltage to the input of each of the three internal power supplies (1501, 1502, 1503) Whereas the fourth power supply 1504 receives operational voltage from power supply 1503 or another source. One internal power supply steps down and converts the voltage to provide (in the preferred embodiment) 12 V dc to the airbox (FIG. 16) to the fans 1202. Internal power supply 1501 steps down and converts the supply voltage to provide 12 V dc to the expansion chamber (FIGS. 17A-C), which powers the blower fan 1702. Internal power supply 1502 steps down and converts the supply voltage to 36 V dc and connects to the expansion chamber powering the ultrasonic module 1701. The fourth power supply 1504 provides 5 V dc to the ultra pump 1707 as well as the drain pump 1706, which pulls water from the expansion chamber (FIGS. 17A-C) to the drain valve 1709.

The PSU (FIGS. 15A-C) has the ability to have its output voltages adjusted via voltage potentiometers 1505, 1506, 1507, 1508. Each potentiometer can vary the relative voltage by +/−15% giving the user control of various aspects of the display.

Being that the PSU (FIGS. 15A-C) is modular, it has built into it a number of interconnects for vapor, as well as electronic connections. When the PSU (FIGS. 15A-C) is used in a large format horizontally configured display (FIGS. 13A-C) the PSU (FIGS. 15A-C) is fastened atop the Modular expansion chamber (FIGS. 17A-C) connection from the vapor output 1703 to the vapor input 1513 of the PSU (FIGS. 15A-C), which then connects to the nozzle input 1301 of the horizontal display (FIGS. 13A-C). The electronics are supplied with electricity via the electric connector output 1509 of the PSU (FIGS. 15A-C) into the expansion chamber (FIGS. 17A-C) electronic connector input 1710.

In the large format vertical orientation display (FIGS. 12A-B) the expansion chamber 1205 (FIGS. 17A-C) connects from the vapor output 1703 to the nozzle input 1203.

The device (FIGS. 12A-B) is a free standing, or hanging/fastened, large format display to be used in a vertically standing orientation and is composed of modular external parts: the expansion chamber 1205, the PSU 1201, the airbox (FIGS. 16A-B).

Large Format Horizontal Display Unit

The large format horizontal display unit is designed to create an image approximately 80 inches in diagonal, although smaller or larger displays are also possible, and emits approximately 3 liters/hour of fluid.

In the embodiments of the large format horizontal display, the device can be powered by voltage ranging from 80-260 V, though most locations will offer either 110 V or 220 V. The only other supply needed to run the device is water, although scents may also be provided.

To power on the device, one must first plug it in to a power source via the power supply unit (PSU) (FIGS. 15A-C) power plug input 1512, which plug may also house a fuse. You then turn the device on by flipping the power switch 1511. Once the device is on, the unit will begin to startup by first pulling water from the water tank via the expansion chamber (FIGS. 17A-C) pump 1707. The water is pulled from an external water tank and into the expansion chamber (FIGS. 17A-C) via the water input valve 1708. Water will continue to fill the expansion chamber (FIGS. 17A-C) until the water lifts the float switch 1705 to the open circuit position, thus cutting voltage to the pump 1707, and shutting off the flow of water. At this time, the ultrasonic emitter 1701 will have the optimal level of water above it to create the vapor medium. The expansion chamber (FIGS. 17A-C) is pressurized by the blower fan 1702, which causes the vapor to exhaust through the vapor output 1703 and into the nozzle 1301, of the airbox (FIGS. 16A-B). In the event the expansion chamber (FIGS.

17A-C) needs to be drained of water for transportation or storage, water can be drained via the expansion chamber drain valve 1709.

The PSU (FIGS. 15A-C) has the ability to have its output voltages adjusted via voltage potentiometers 1505, 1506, 1507, 1508. Each potentiometer can vary the relative voltage by +/−15% giving the user control of various aspects of the display. Though in some embodiments the variation of voltage controlled by the potentiometer may be higher and/or lower.

The expansion chamber (FIGS. 17A-C) may have an electronic connector input 1704 for use with multi-orientation large format displays, though it is not required for operation in the horizontal, or vertical large format displays.

Being that the PSU (FIGS. 15A-C) is modular, it has built into it a number of interconnects for vapor, as well as electronic connections. When the PSU (FIGS. 15A-C) is used in a large format horizontally configured display (FIG. 13) the PSU (FIGS. 15A-C) is fastened atop the Modular expansion chamber (FIGS. 17A-C) connection from the vapor output 1703 to the vapor input 1513 of the PSU (FIGS. 15A-C), which then connects to the nozzle input 1301 of the horizontal display (FIGS. 13A-C). The electronics are supplied with electricity via the electric connector output 1509 of the PSU (FIGS. 15A-C) into the expansion chamber (FIGS. 17A-C) electronic connector input 1710.

In the large format vertical orientation display (FIGS. 12A-B) the expansion chamber 1205/(FIGS. 17A-C) connects from the vapor output 1703, to the nozzle input 1203.

Vapor enters the airbox (FIGS. 16A-B) via the nozzle 1301. Due to the pressure that is applied to the vapor, the vapor then exhausts from the nozzle 1301 through (in the preferred embodiment) four layers of honeycomb, though fewer layers or more layers may be used (1304) and then out of the exit of the airbox (FIGS. 16A-B). As vapor collects within the nozzle 1301, condensation is bound to occur. The resulting water is drained through the bottom of the nozzle 1301 by gravity or pump, and back into the expansion chamber (FIGS. 17A-C) through the nozzle 1301. The vapor medium exhausted by the nozzle 1301 is supported by layers of air pressure on both sides; these are supplied by the airbox fans 1305. The airflow from the airbox fans 1305 first pass through sheets of mesh screen to even out air turbulence and pressure, the airflow then passes through the first layer of honeycomb 1304 which has sheets of mesh attached on both sides of the nozzle. The air continues on through another layer of honeycomb 1304 then another layer of mesh and honeycomb 1304 and finally through a final layer of honeycomb 1304 and more or less depending on the embodiment. These layers of honeycomb even out turbulence and pressure from the airflow resulting in a laminar flow of air that acts as barriers guiding the vapor medium that is exhausted from the nozzle 1301 in a flat and straight form.

All of the components inside the device are supplied power by the power supply unit (PSU) (FIGS. 15A-C). The PSU takes external supply voltage, typically 110 V-220 V, via the power plug input 1512 and distributes that voltage to the input of each of the three internal power supplies (1501, 1502, 1503) Whereas the fourth power supply 1504 receives operational voltage from power supply 1503 or another source. One internal power supply steps down and converts the voltage to provide (in the preferred embodiment) 12 V dc to the airbox (FIG. 16) to the fans 1305. Internal power supply 1501 steps down and converts the supply voltage to provide 12 V dc to the expansion chamber (FIGS. 16A-B), which powers the blower fan 1702. Internal power supply 1502 steps down and converts the supply voltage to 36 V dc and connects to the expansion chamber powering the ultrasonic module 1701. The fourth power supply 1504 provides 5 V dc to the ultra pump 1707 as well as the drain pump 1706, which pulls water from the expansion chamber (FIGS. 17A-C) to the drain valve 1709.

The device (FIGS. 13A-C) is a free standing, or hanging/fastened, large format display to be used in a horizontal orientation and is composed of modular external parts: the expansion chamber 1303, the power supply unit 1302, the airbox (FIGS. 16A-B). In the hanging configuration, the display image is below the unit, and a trough (FIGS. 23A-E) may be used to collect the water vapor.

In some embodiments, the large format vertical embodiment and the large format horizontal embodiment differ in the nozzle design. Instead of a bottom fed nozzle input found in the large format vertical embodiment, the horizontal embodiment has a side fed nozzle input to make up for gravity's effects on the denser than air condensate used for the screen medium. The power supply unit 1302 and the expansion chamber, in the case of the large format horizontal embodiments, are mounted to the side of the airbox (FIGS. 16A-B) rather than the bottom end as found in the large format vertical embodiments.

The large format display airbox (FIGS. 16A-B) is also a modular design. This means that the Modular PSU (FIGS. 15A-C) as well as the modular expansion chamber (FIGS. 17A-C) can be attached to the airbox (FIGS. 16A-B) to be used in either a horizontal or vertical configuration, although an airbox may be used that can work in only one of those configurations. To be assembled in the horizontal configuration, the PSU (FIGS. 15A-C) connects to the horizontal nozzle input 1602, via the vapor throughput 1513, which receives vapor via the expansion vapor output 1703. If assembled in a vertical orientation, the PSU (FIGS. 15A-C) sits atop the airbox (FIGS. 16A-B) while the expansion chamber (FIGS. 17A-C) sits beneath the airbox (FIGS. 16A-B) and connects to the vertical nozzle input 1601 via the Expansion vapor output 1703. The airbox (FIGS. 16A-B) houses a series of mesh, and honeycomb layers 1603, that in the preferred embodiment amount to 5, though more or fewer layers can be used. The airbox (FIGS. 16A-B) also houses the airbox Fans 1604, which pushes air through the layers of mesh and honeycomb 1603, creating a laminar airflow that carries the vapor screen medium through the air with little turbulence.

The large format horizontal and vertical display units may include the scent dispenser feature (FIG. 18) using the teachings of the other embodiments. For example, the relationship of the scent dispenser to the airbox may be adapted to the large format horizontal and vertical display units by one of ordinary skill in the art.

Jumbo Format Horizontal Display Unit

The jumbo format horizontal display unit is designed to create an image approximately ten feet in diagonal, although smaller or larger displays are also possible. In particular, by combining multiple horizontal display units through ganging them together via the nozzle coupler 1402 and supplied ganging hardware 1405. Fluid usage varies depending on size of the display.

In the embodiments of the jumbo format horizontal display, the device can be powered by voltage ranging from 80-260 V, though most locations will offer either 110 V or 220 V. The only other supply needed to run the device is water, although scents may also be provided.

Figure 22B:
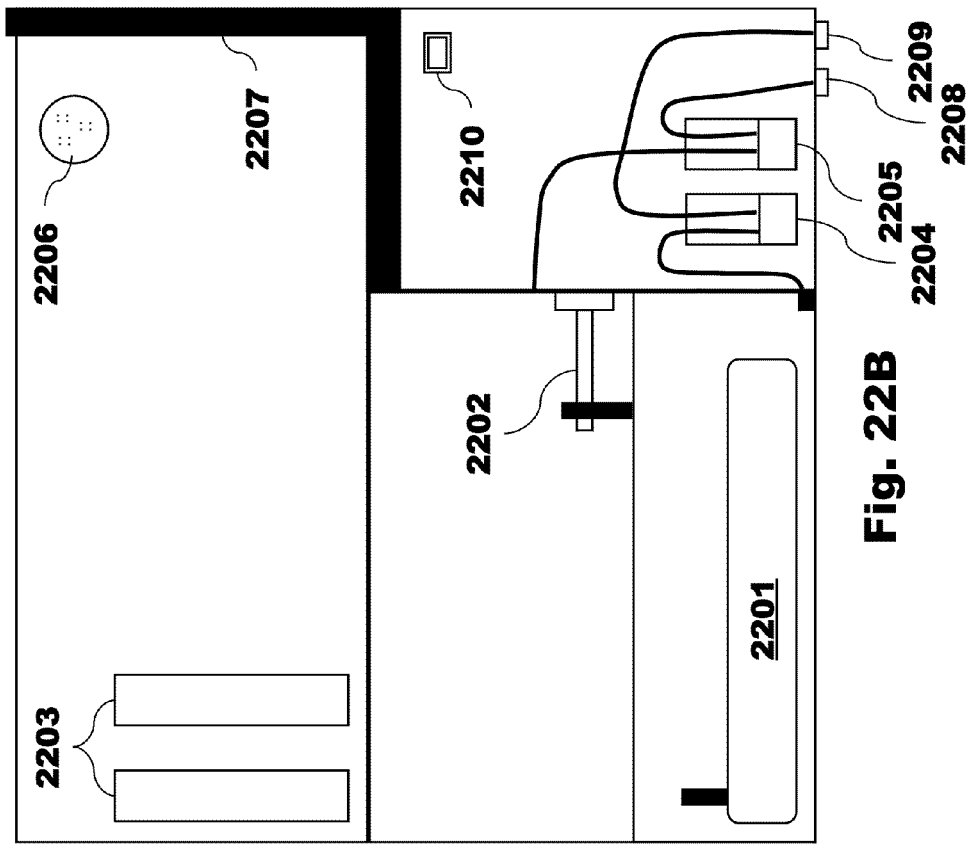
FIGS. 22A-B show views of a jumbo format expansion chamber, according to an embodiment of the invention.
Figure 22A:
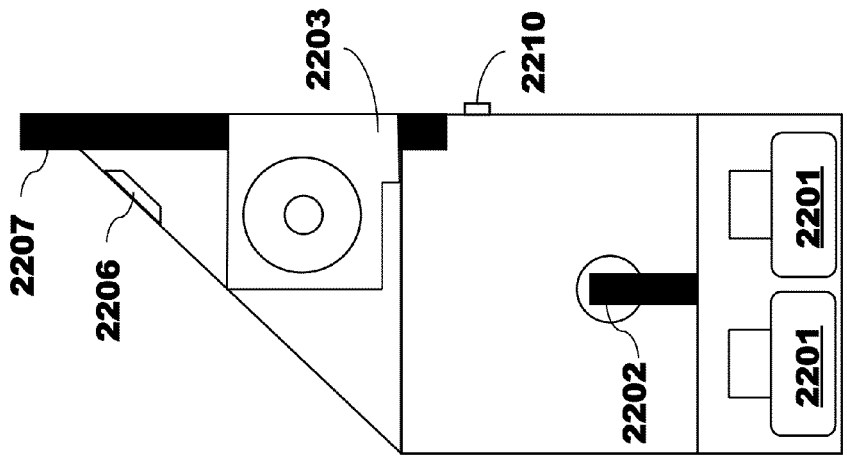

To power on the device, one must first plug it in to a power source via the power supply unit (PSU) (FIGS. 20A-B) power plug input 2003, which plug may also house a fuse. You then turn the device on by flipping the power switch 2003, which is part of the power plug input housing. Once the device is on, the unit will begin to startup by first pulling water from the water tank via the expansion chamber (FIGS. 22A-B) into the intake pump 2205. The water is pulled from an external water tank and into the expansion chamber (FIGS. 22A-B) via the water input valve 2208. Water will continue to fill the expansion chamber (FIGS. 22A-B) until the water lifts the float switch 2202 to the open circuit position, thus cutting voltage to the pump 2205, and shutting off the flow of water. At this time, the ultrasonic emitter 2201 will have the optimal level of water above it to create the vapor medium. The expansion chamber (FIGS. 22A-B) is pressurized in the preferred embodiment by two blower fans 2203 but in some cases can use more or less blower fans, which causes the vapor to exhaust through the vapor output 2207 and into the nozzle 2102, of the airbox (FIGS. 21A-C). In the event the expansion chamber (FIG. 22) needs to be drained of water for transportation or storage, water can be drained via the expansion chamber drain valve 2209 via the water drainage pump 2204 which is controlled by the water drain switch 2210.

The PSU (FIGS. 20A-B) has the ability to have its output voltages adjusted via potentiometers on the control panel 2004. In the preferred embodiment each potentiometer can vary the relative voltage by +/−15%, but in some cases they can be configured to change relative voltage by a lower or higher percentage, giving the user control of various aspects of the display such as vapor density, fan speed and pump power.

In the jumbo format horizontal orientation display (FIGS. 19A-C) the expansion chamber 1902 (FIGS. 22A-B) connects from the vapor output 2207, to the nozzle 1908.

Vapor enters the airbox (FIGS. 21A-C) via the nozzle 2102. Due to the pressure that is applied to the vapor, the vapor then exhausts from the nozzle 2102 through (in the preferred embodiment) four layers of honeycomb, 3 of which are ⅝ inch in thickness 2106 and the final layer may be 2 inch in thickness 2105, though fewer layers or more layers may be used and their thickness could vary between ⅛ inch and 8", after the final layer of honeycomb 2105 the vapor then exits the airbox (FIGS. 21A-C). As vapor collects within the nozzle 2102, condensation is bound to occur. The resulting water may drip through the honeycomb and out which can be left to fall to whatever surface is below, or into a receiving trough (FIGS. 23A-E)

The receiving trough (FIGS. 23A-E) in its preferred embodiment performs two main functions; to act as a vacuum to pull inward the end of the vapor screen, as well as take in and evaporate water droplets that come from the device above. The receiving trough (FIGS. 23A-E) can be built into the existing flooring, or installed onto the flooring. The top of the trough is made from a perforated metal sheet 2301 that allows the vapor, water droplets and air 2306, 2308 to be pulled inward by the vacuum caused from the cross-flow blower fans 2303. The blower fans 2303 then push the vapor and air 2309 into the porous material 2310. This porous material 2310 also soaks the water droplets 2306 into its latticed structure increasing the surface area of the absorbed water. This increased surface area allows the airflow 2309 from the blower fans 2303 to evaporate the absorbed moisture. The airflow then exits the trough (FIGS. 23A-E) via the side panels 2304 into the environment 2307. The blower fans 2303 receive line voltage from an external source via the power plug 2305, or in some embodiments, from the device mounted above. The line level power runs the blower motors 2311 which cause the blower fans 2303 to operate. There is a layer of honeycomb 2302 mounted directly below the perforated metal sheet 2301 which aids in the uniformity with which the vacuum intakes the vapor, water droplets and air 2306. In some embodiments the receiving trough (FIGS. 23A-E) may be only contain the perforated sheet 2301, to capture only water droplets that may be drained after a period of time. The trough (FIGS. 23A-E) may be ramped on the front, back, and either side, or it may be rectangular. The ramped version may aid in above ground installation to increase ease of walking over, or rolling objects over the trough. The ramped version may not be necessary when the trough is installed into the existing flooring, and a rectangular wall or wall of another geometry may be used instead. The trough may be used with the jumbo format unit or the large format horizontal unit with the display image below the unit, depending on the dimensions of the trough. Multiple troughs may be used in sequence when ganging display units together, or alternatively a longer trough may be used.

The vapor medium exhausted by the nozzle 2102 is supported by layers of air pressure on both sides; these are supplied by the airbox fans 2103. The airflow from the airbox fans 2103 first pass through sheets of mesh screen 2107 to even out air turbulence and pressure, the airflow then passes through a series of honeycomb sheets 2106 that are evenly spaced apart. After the first series of honeycomb sheets, the airflow and vapor passes through a final layer of honeycomb 2105 and more or less depending on the embodiment. These layers of honeycomb even out turbulence and pressure from the airflow resulting in a laminar flow of air that acts as barriers guiding the vapor medium that is exhausted from the nozzle 2102 in a flat and straight form. The nozzle 2102 receives vapor from the ultrasonic expansion chamber (FIGS. 22A-B) via the vapor output tube 2104. Inside of the airbox (FIGS. 21A-C) on either side of the nozzle 2102, the side walls of the unit slant inward 2101, 2102, which increases air velocity and further reduces turbulence before the airflow reaches the final layers of honeycomb. Before the airbox fans 2103, there is a layer of honeycomb 1912 that act as air vanes, controlling incoming air turbulence and allows for a more uniform fan output. Directly after the airbox fans there is another sheet of honeycomb 1905 that reduces air turbulence and evens air pressure before the airflow reaches the layers of mesh 1913.

Figure 20B:
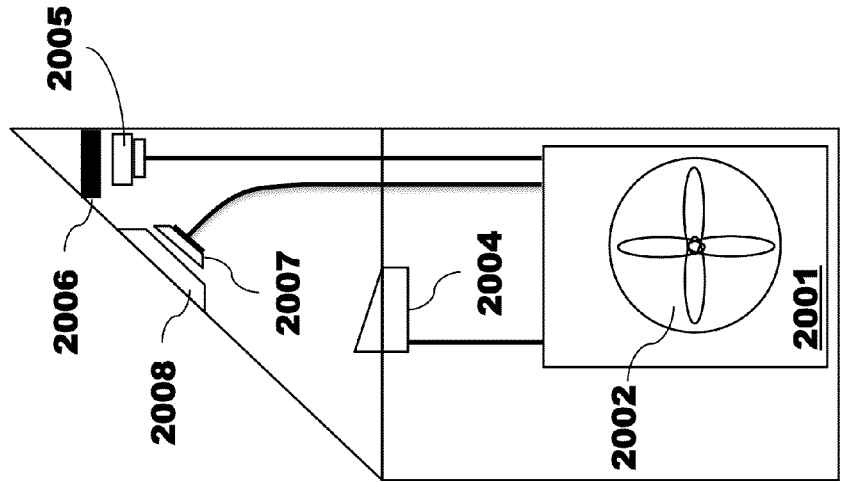
FIGS. 20A-B show views of a jumbo format power supply unit, according to an embodiment of the invention.
Figure 20A:
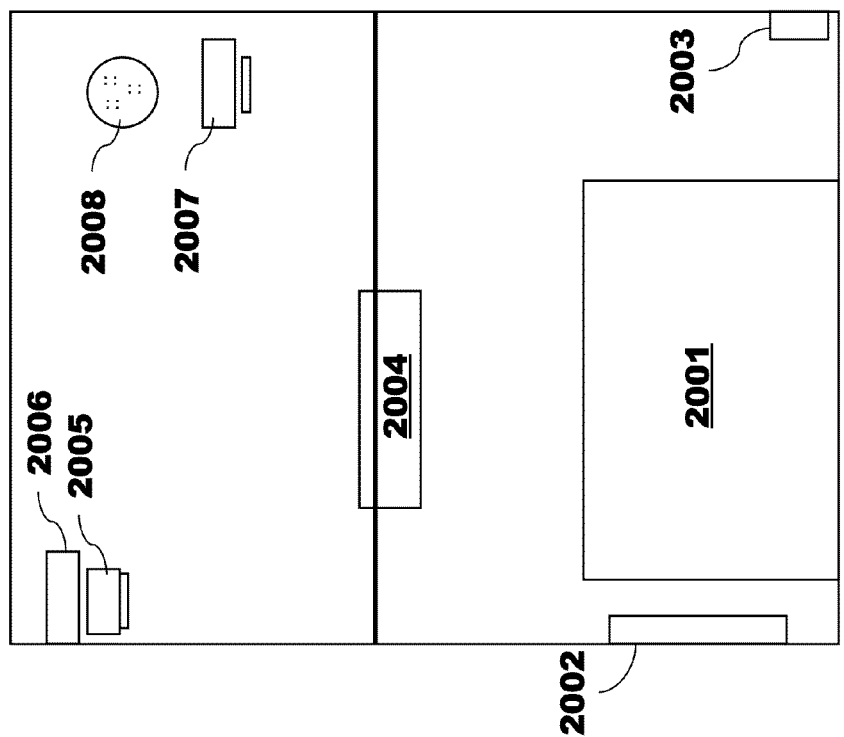

All of the components inside the jumbo format display are supplied power by the power supply unit (PSU) (FIGS. 20A-B). The PSU takes external supply voltage, typically 110 V-220 V, via the power plug input 2003 and distributes that voltage to central PSU unit 2001. The central PSU unit 2001 takes the line level voltage from the power plug input 2003 and through its circuitry outputs (in the preferred embodiment) a 5 volt, two separate 24 volt, and a 36 V output, each of which are controlled by potentiometers on the PSU control panel 2004. One of the 24 V outputs from the central PSU unit 2001 is sent to the airbox fans 1906 via the airbox fan output connector 2008 into the airbox fan input connector 1903. Both the 5 V and the 36 V outputs are sent to the intake and drain pumps 2204, 2205 and the ultrasonic modules 2201 respectively, via the ultra output connector 1904 to the ultra input connector 2206. The second 24 V output is also sent through the ultra output connector 1904 to the ultra input connector 2206 and supplies (in the preferred embodiment) two blower fans 2203 that pressurize the vapor for the screen medium. In other embodiments, fewer or more, smaller or larger blower fans may be used.

Before the air enters the airbox (FIGS. 21A-C) air passes through a sheet of honeycomb 2108 which acts as an air vane, this helps to even the incoming air and allow a more uniform exhaust into the second layer of honeycomb 2109 found directly after the airbox fans 2103. The second layer of honeycomb 2109 takes the pressurized air and begins evening out the pressure and turbulence before the air gets to the series of mesh screens 2107.

The device (FIGS. 19A-C) is a free standing, or hanging/fastened, jumbo format display to be used in a horizontal orientation and is composed of modular external parts: the expansion chamber 1902, the power supply unit 1901, the airbox (FIGS. 21A-C).

In some embodiments the large format vertical embodiment and the large format horizontal embodiment as well as the jumbo format embodiment differ in the nozzle design. In some embodiments the nozzle 1401 can be gang-able (FIGS. 14A-B), meaning multiple devices can be linked together to essentially create a wider screen. There is an interlocking coupler sleeve 1402 that seals the open-ended nozzles together in conjunction with the coupler gaskets 1403. There is also a sealing gasket 1404 between each open end of the nozzles 1401 that will be ganged together. The interlocking coupler 1402 is fastened to each nozzle via two set screws 1405, though more set screws may be used.

The jumbo format airbox (FIGS. 21A-C) houses a series of mesh 2107, and honeycomb layers 2106, 2105, that in the preferred embodiment amount to four, though more or fewer layers can be used. The airbox (FIGS. 21A-C) also houses the airbox Fans 2103, which pushes air through the layers of mesh and honeycomb 2107, 2106, 2105, creating a laminar airflow that carries the vapor screen medium through the air with little to no turbulence.

A jumbo format vertical display unit may be created through the combination of the teachings of the jumbo format horizontal display unit and the large format vertical display unit.

The jumbo format horizontal and vertical display units may include the scent dispenser feature (FIG. 18) using the teachings of the other embodiments. For example, the relationship of the scent dispenser to the airbox may be adapted to the large format horizontal and vertical display units by one of ordinary skill in the art.

Display Content

The light source (e.g., projector) takes information from the media source (e.g., content) and transmits it to the vapor display medium via the light it emits. The light source can project simple shapes, images, pictures, videos, or any other type of visible projectable content onto the vapor medium emitted by the airbox.

Content for display in the various embodiments may be tuned for improved appearance on the vapor display. For example, increased saturation of colors compared with other displays can improve the appearance on the vapor display. Otherwise, the colors can appear washed out compared with displaying the same content on another type of display device. The principles of rear projection displays may be applied to the vapor display devices, including techniques for increasing the gain. The density of the water vapor can affect how fine detail in the content is shown. For example, it may be desirable to use bolder fonts when content with lighter weight fonts, e.g., with hairlines, does not appear distinctly. This problem may be exacerbated when in environments with higher ambient light. The arrangement of the nozzle, airbox, and honeycombs is designed to have smaller and more evenly dispersed water vapor than the existing approaches to enable display of finer detail.

The angle of the light source with respect to the vapor display can also affect the legibility of the displayed content. If the light source shines perpendicular to the vapor display, it is called on-axis projection; otherwise it is called off-axis projection. With greater off-axis projection, image clarity and apparent brightness can decrease. The angle of the viewer with respect to the vapor display can also affect the legibility and apparent brightness of the vapor display. If the viewer looks perpendicular to the vapor display, it is called on-axis viewing; otherwise it is called off-axis viewing. With greater off-axis viewing, image clarity and apparent brightness can decrease. However, the light source should be placed so it does not directly shine into the eyes of the viewers of the vapor display. There is a relationship between the projection angle of the light source, the viewing angle, the light source brightness, ambient light levels and the brightness of the content, in terms of resultant legibility and apparent brightness of the vapor display. The vapor display may be placed so as to optimize the viewing angle in conjunction with the projection angle. The vapor display may also be placed to reduce the effect of ambient lighting in the vicinity of the vapor display. Increasing the brightness of the light source can help with both legibility and apparent brightness. Using a sharper light source (such as a laser projector) can improve legibility, particularly when the droplets are small as in the preferred embodiments, and can also help with contrast. Changes the media source, such as those discussed above, can help with improving legibility and apparent brightness.

The preferred embodiments of the upright display booth unit (e.g., FIG. 1), upright display pedestal unit (e.g., FIG. 6), and table-top display unit (e.g., FIG. 7) are specifically designed with off-axis projection, with the light source shining just out of the line of sight of the viewer and completely contained within body of the unit, and either on-axis viewing or somewhat off-axis viewing, in order to improve the legibility and apparent brightness of the display.

In some embodiments, the light source device is internal to the display device, while in other embodiments the light source device is external to the display device so that it has the appropriate angle to the vapor display and viewing angle, as described further above.

In the various embodiments, the media source may be from a computer contained within the display device. Alternatively, the media source may be from a computer external to the display device. Instead of, or in addition to, content from a computer, the content may come from another source, such as a media player (e.g., DVD or Blu-ray player), camera, or networked media source.

Software that provides content for the media source may be scripted or provide for easy configuration by a user, such as someone who sets up the device. The scripting may be done through a menu system, through web programming (such as HTML5 or JavaScript), or through Adobe Flash or comparable system. With appropriate configuration, choice of embodiment, choice of input device(s), positioning of the user and the display, the apparatus may be used to play games, such as video games and educational games. The games or other content may be used for advertising. The apparatus may be configured with devices for obtaining payment, such as a credit card or stored value card reader, or by providing some other user or account identifier, such as face or gesture recognition or the use of a virtual keyboard. Other identification or input devices may be used, including NFC (near field communication) or barcodes, such as QR codes (quick response code). The apparatus may be used to dispense items of value to the user, such as products through an associated vending machine, or by communicating with an ordering system, such as a food or beverage ordering system at a restaurant or for room service in a hotel. The ordering system may be used to obtain products for delivery near the display or at an alternative location. The apparatus may also be used for gambling, such as a slot machine, with the appropriate input or output devices. The apparatus may also be used for gambling in conjunction with a croupier or dealer.

ADDITIONAL DESCRIPTIONS AND EMBODIMENTS

Alternative descriptions follow, which may relate to some of the embodiments of the invention.

Figure 14A:
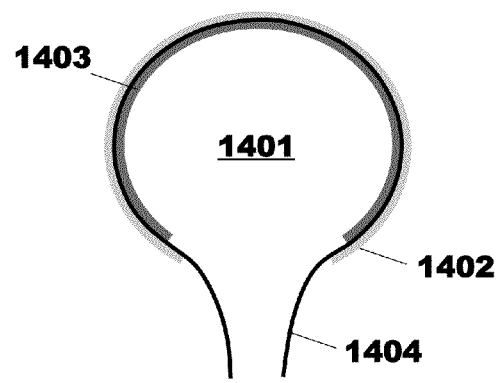
FIGS. 14A-B show views of a large format gang-able nozzle design, according to an embodiment of the invention.
Figure 14B:
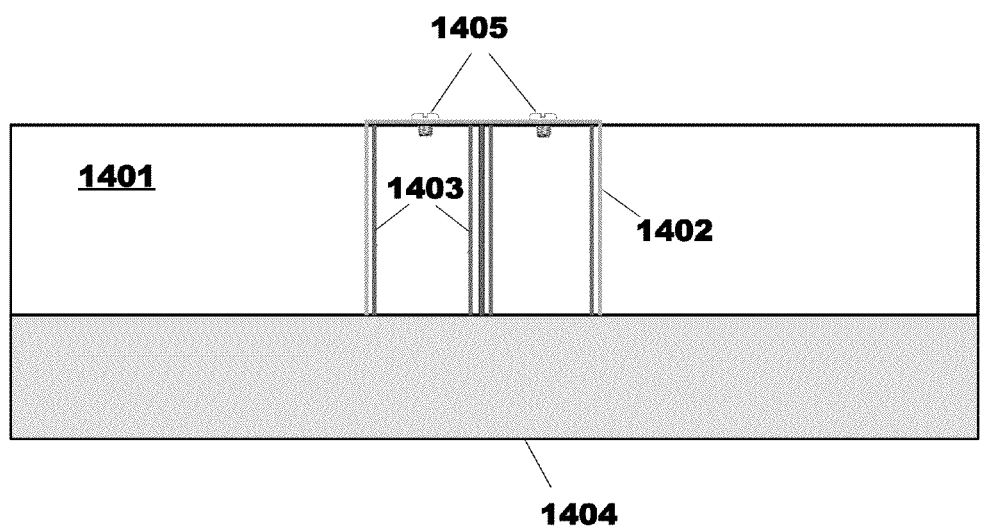

The teachings of the jumbo horizontal format embodiments (e.g., FIGS. 19A-C) where the image is below the device may also be applied to the large format (e.g., FIGS. 13A-C), including the trough (FIGS. 23A-E) and the ability to gang units together (FIGS. 14A-B).

The teachings of the gangability of various embodiments can be performed by end users as well as the manufacturer or third party via basic hand-tool hardware, and re-locating modules to mounting locations designated for the desired orientation. Only screws, wiring harnesses, and tube couplers need be disconnected and reconnected, but are designed in a way that this cannot be done incorrectly. Depending on mounting requirements, some embodiment orientations may be freestanding on the ground, hanging vertically from a pillar or other structural support, from the ceiling via cabling or other support, from above via scaffolding or other support structure, upon a table or other raised surface, or installed into an object such as furniture piece, wall, ceiling, or any other surface or container.

In some embodiments the power supply takes the input power from the location (from 80 V to 260 V) and outputs discrete voltages (3 V, 12 V, 24 V) or (5 V, 24 V, 36 V) or any other combination thereof, to different parts of the equipment. Depending on the embodiment the power supply may supply 3 V-5 V to the pump inside of the expansion chamber, 12 V-24 V to the fan assembly, 12 V-24 V to the blower fan in the expansion chamber, 24 V-36 V to the vapor module in the expansion chamber, line level voltage to the light source, And line level voltage to the media source. In some embodiments, other voltages may be used.

In some embodiments the voltages within the power supply are variable by about +−15%, which in turn may change the power traveling to each part.

The water tank is a container for the preferred liquid, which is used to produce the vapor screen. The liquid is pulled from the water tank by the pump located within the expansion chamber and deposited inside the expansion chamber reservoir. In the preferred embodiment the liquid would be water. Though, in some embodiments the liquid could any liquid that can react to ultrasonics to create a fog or vapor. In some embodiments the liquid can have additives included in varying percentages, so long as the liquid remains able to react to ultrasonics to create a fog or vapor.

When the water comes to the optimal level within the expansion chamber as dictated by a floating water level switch, the pump is turned off to maintain the optimal water level for vapor production within the expansion chamber. Around this time, the vapor producing module will be atomizing the water into vapor within the expansion chamber. The blower fan located within the expansion chamber is constantly pressurizing the expansion chamber forcing the newly created vapor out and into the airbox nozzle.

The airbox contains a series of honeycomb panels and mesh sheets which break up the turbulence and even the air pressure of the air supplied by the fan assembly creating a laminar flow of air on both sides of the nozzle. The nozzle located centrally in the airbox deposits a steady even stream of vapor through the series of honeycomb panels and mesh sheets independent of the airflow being supplied by the fan assembly. When the vapor medium passes through these layers, its turbulence is also reduced and pressure is evened out, thereby creating a laminar flow of vapor between the laminar flow of air creating a sheet of vapor on which light can be projected upon by a light source.

The fan assembly pressurizes the airbox and is emitted once passing through a series of honeycomb panels and mesh sheets. Once the air has passed through the airbox, it is free from turbulence and at an even pressure creating a laminar flow of air, which maintains its trajectory in the direction it is being emitted.

The honeycomb, referred to in each embodiment, can have cells of various shapes and sizes. These shapes include hexagonal, cylindrical, square, rectangular, pentagonal, octagonal and so on. In the preferred embodiments a hexagonal, or a cylindrical cell shaped honeycomb may be used. The cell sizes and lengths may also vary depending on embodiment. In the preferred embodiment sizes of honeycomb cells are $3/16$ inch for both hexagonal and cylindrical cell shapes. In the preferred embodiment $5/8$ inch and 2 inch depth cells are used, though cell depth as well as cell size can vary in alternate embodiments.

The preferred honeycomb cell size is $3/16$ inch. In some embodiments larger sizes such as $1/4$ may offer increased protection from condensation as the size of the cell is larger (which makes it more difficult for water to collect). However, the screen quality diminishes, resulting in some visible separation lines from the discrete cells. The displays in some embodiments may use $1/8$ or $5/16$ inch cells. For example, a $1/8$ inch cell size will have a clearer image and less noticeable lines, but it will accumulate condensation much faster than a larger cell, which requires outside interaction to clear. A $5/16$ inch cell size would also work nicely in terms of very little risk of condensation as the cell walls are too far away from each other to easily allow a water droplet to collect the whole way around before dripping out. However, the image quality is degraded, much less clear with more visible lines. When selecting a cell width, the inventor discovered an optimal balance of image quality and low condensation obtained by $3/16$ inch cell size.

The honeycomb, referred to in each embodiment, can be made of various materials. Honeycomb materials of aluminum in various grades or plastic (thermoplastics, polycarbonate, ABS, PVC, polypropylene, and other plastic compositions) are used. Though in alternate embodiments a honeycomb material of Kevlar, carbon, aramid, cardboard, varieties of steel, and other metals or fibrous materials may be used. As further described below, the particular choice of materials may depend on the fluid used or fluid additives.

The device in various embodiments creates laminar flows using a series of fans to pressurize on one end, the air flow through the series of honeycomb, tubular, mesh layers and empty spaces. Upon this air reaching the single nozzle the pressure and laminar flow of the medium then pulls the low density vapor medium through the remaining honeycomb, tubular, and mesh layers and out of the airbox in the form of a flat sheet of low density vapor and primarily air.

An apparatus that uses suction to pull in excess vapor, water droplets and condensation into a series of sponge type cells with a large surface area.

In the preferred embodiment, there are two flows present in this display technology: the air flow provided by the main fans (A), and the flow of the air/vapor mixture being generated in the expansion chamber (B). The volume of air/vapor mixture in B will not exceed 5% of the volume A (carrier air), but B itself is not 100% vapor. But the air/vapor mixture in B is less than 1 part water to 100 parts air. Thus the output air/vapor mixture of the vapor screen is less than 5 parts water to 10,000 parts air. One can adjust the air flow of the main fans A and the expansion chamber blower fans and thereby adjust the ratio of water to air. Slightly increasing the ratio of water to air (i.e., water density) may be useful in bright ambient light environments to increase the apparent brightness of the image. Large increases in water density are unnecessary and would use more water, with increased risk of condensation damage. Furthermore, higher water density reduces clarity of the image. So in the preferred embodiment the adjustment +−35% or less.

We will label the 2 airflows as A and B. Airflow A is the airflow that is created from the rear fan assembly of the airbox, it travels through the airbox past the nozzle, through multiple layers of honeycomb and mesh and out of the front split on either side of Airflow B. Airflow B is the air/vapor mix that is created inside of the ultrasonic chamber, pressurized by the blower fan and emitted through the nozzle, through multiple layers of honeycomb, and then our of the airbox between the split airflow layers of Airflow A. Each side of Airflow A will never be thinner than 2 inch as it is a physical limitation on the airbox's internal nozzle design. Generally, the larger the screen, the thicker the Airflow A. A screen that is emitted 15 inch from the honeycomb would have 4 inch think sheets of air on either side provided from the single airflow A. We have found that every time you double the emission distance, you increase the width by 0.75, for example, to have a screen emitted 15 inch would take 4 inch sheets of air on either side of flow B, for a screen emitted 30 inch it would take 7 inch air sheets on either side of flow B. For a screen emitted 60 inch it would take a sheet of airflow thickness of about 12.5 inch on either side of flow B.

The vapor will only ever make up a maximum of 5% of the total air flow volume of the display. The display may operate, however, with the vapor making up as little as 1% of the total air flow volume. Where the density falls within that range is up to the user and is changed depending on different environmental variables such as light, ambient humidity, ambient airflow, content, as well as the desired effect of the user. This percentage is controlled via the +−15% voltage variation of the ultrasonic's power supply (1505), as well as the variable voltage of the blower fan power supply via set screw (1506) or potentiometer.

The total air/vapor flow CFM (cubic feet per minute) of the devices vary, though the CFM ratio of air provided by the rear fans to low density vapor is 20:1. Though the ratio may increase (as in higher air:vapor ratio) as the rear fans and the blower fan can be individually adjusted by +−15%.

The nozzle receives the pressurized air/vapor mix from the ultrasonic chamber via the blower fan. The blower fan can have a flow rate range from 25 CFM (cubic feet per minute) up to 75 CFM depending on embodiment. The required flow into the nozzle is relative to the size of the nozzle and while a nozzle will run as low as 10 CFM we have found that a minimum of 25 CFM is preferable. Lower fan speed in CFM will encourage condensation as the vapor is not as forcibly pushed through the honeycomb essentially blowing clear the cells, but too high fan speed in CFM can be too loud and draw too much power for comfortable operation. A drastically higher CFM relative to the screen size can increase the air-to-vapor ratio too greatly so there is not have enough vapor to reflect or refract light and give a visible image. A nozzle length ranging from 12"-72 inch can operate in a range of 25-75 CFM properly, depending on the use of the particular device, a different blower fan can be installed with a different CFM range. For example, a 25 inch length nozzle display that will be installed in a hotel lobby permanently may have a blower fan installed that has a CFM range of 25 to 35 whereas a 25 inch length nozzle display that will be used as a temporary travelling display, which may encounter differing ambient humidity, higher ambient airflows, etc. may have a blower fan installed that has a range of 40 to 50 CFM.

The most important nozzle specification is the slot width of the mouth, which is consistent across all devices. In the preferred embodiment, the width is measured at 3/16 inch. This corresponds in the preferred embodiment to a 1/4 inch honeycomb cell to avoid condensation and clogging within the cell. Using a thicker screen would lower the clarity of the image on the screen, and also use more water.

The determination of when flow is no longer sufficiently laminar is based on when image quality is degraded to the point of visible breaking of the image. In the case of a device having a 16:9 aspect ratio image in a horizontal configuration, or 9:16 aspect ratio image in a vertical configuration, we can define the usable space of the vapor medium if we know the length of the screen. In the case of a horizontal screen with a width of 80 inch the screen would emit a sufficiently laminar flow of at least 45". Breaking can be measured by the noticeable turbulence being introduced to the screen in the form of waving or creating gaps in the vapor sheet. It is no longer sufficiently laminar if those waves travel more than +−2 inch from its emitted path, or a gap opens in the flat sheet of more than 1/2". The screens are designed so the screen does not have any turbulence within the rated distance.

In the preferred embodiment, scents that can be used are made from essential oils, aroma compounds, fixatives or solvents. The scents can either placed into the water tank of the display or dispensed by a modular scent dispenser by a separate mist nozzle from a separate scent tank that need not have water in it. The mist nozzle may be in various locations, including separate from the vapor and air mixture, or in line with the vapor and air mixture. When stored in the same water tank, the scent becomes vapor via the same process as the water, then dispensed out of the nozzle and into the air by the same method. Alternatively, a modular scent dispenser can separately control the amount and timing of scent dispensing, such as by device's sensor or other programming. The amount of scent additive that is used may have a mix range of 1:100 to 10:100 additive to water volume mix, or more or less scent, depending on the strength and amount of additive desired.

In the various embodiments, additives can supplement the desired liquid such as phosphorescents, luminescents, chlorophyll, vitamins and minerals. The light source can be ultraviolet or black light, which can interact with phosphorescents or luminescents in a vapor in a beneficial manner. When using fluids other than water or certain additives, such as those containing alcohol, the various materials containing the fluid or in contact with the vapor should be a material that does not degrade in interaction with the fluid or vapor. Similarly, the material should not adversely affect the fluid or vapor.

We select the specific ultrasonic transducers that create droplets in the 10-20 micron range. These transducers have no setting to change the droplet size, but they can have their voltage varied by +−15%, which can increase or decrease the amplitude of the transducer, resulting in higher or lower vapor density. Depending on the surface tension and the viscosity of the liquid or additive liquids, the droplet size may change.

The water droplet size ranges between 10 to 20 microns. The droplets are created using an ultrasonic transducer. The small liquid droplets are suspended in a flow of air, and the vapor makes up less than 5% of the flow's volume.

The media source supplies content to the light source. It could be any hardware or software that is compatible with the light source.

The vapor medium is emitted from the nozzle located within the airbox. The light source emits light upon the vapor medium, which reflects and refracts said light, creating a visible image, shape, video, or other type of content on the vapor medium.

The user may alternatively interact with the apparatus by physically interacting with one or more input devices, including by touch, or by using other input mechanisms, such as voice control or by blowing on an interface, such as a sip-and-puff interface for the disabled.

In any of the various embodiments above, the quantity and voltages supplied by the power supply unit and used by the other components may vary depending on the requirements of the components being supplied with power, as would be readily understood by one skilled in the art. Alternative components requiring power may be substituted with other parts with differing power requirements.

In alternative embodiments, each potentiometer can vary the relative voltage by more or less than +/−15% giving the user control of various aspects of the display. The user may be the end-user or the user may be someone who installs or sets up the display Advantageously, embodiments of the present invention may be easily configured by the user to select various options for installation and operation. For example, models can be configured by the user to change display screen orientation and installation/integration options.

- These features include the capability to change the screen medium density, airflow velocity, display screen orientation and display screen size without extensive technical product knowledge or training
- These features provide the user a ready means to optimization device performance, and provide ease of maintenance and use.
- Some environments may have higher or lower ambient lighting, different constant airflows, and different ambient humidity or have very stringent, stable climate requirements.
- Some users need devices that can travel to different locations with as little complications in setup, teardown, operation and maintenance as possible.
- In the cases where maintenance is needed, users can service the device with little technical knowledge or guidance to increase productivity, minimize equipment downtime, performance as well as reduce maintenance or service costs maintenance.

It is important to understand is that in addition to specific environments or content, each user may have a particular aesthetic or experience that they need to create for their display audience. It is not for the manufacturer to decide for them, and that is why user variable settings are invaluable. Each device can be tuned by the user to suit their preferences, or to meet the requirements of that specific installation. Users also travel, are in remote locations, or are in areas that can not easily facilitate the shipping and receiving of devices in need of maintenance, nor easily have a technician travel to them. This is another benefit of the modular systems, users can have multiple modular parts such as PSU's (FIGS. 15A-C), where in the case of a failure related to any of the internal power supplies (1501, 1502, 1503, 1504) or any other part therein, can easily be swapped by the user who does not need to be technically trained in the devices. This allows for minimal downtime, increases productivity and reduces costs as well. The user also benefits from the modular design as different internal items are redesigned and improved, allowing a user to swap an older modular unit, for a potentially upgraded modular part. This increases the longevity of the device as it will not quickly become obsolete as new technologies and methods emerge.

These settings are described below in relation to one embodiment, but also may be part of the other embodiments described, which will have similar settings or adjustments.

1. User Controlled Density Setting (1505).

The vapor density setting (1505) is useful for the initial setup of the display and every time it is installed into a new location. Generally a suitable starting point for the density is dependent on the lighting of the room in which the device is installed. A higher lighting environment may require a higher vapor density in order to increase the vapor present, which will reflect and refract more light, though the user may want a less bright image to increase the perception of depth. For example, in a high lighting environment, a directory with a map and text would is better displayed with a bright clear image and so the user may opt for a higher density. An image of a ghostly person, on the other hand, may be better displayed with a lower density, since a ghost is generally thought of as being transparent. This also goes for lower lighting environments; it is dependent on the user's specific requirements.

The density also serves a purpose aside from visual differences. As a higher density emits more moisture into the environment, it may not be suitable for use in climate-controlled environments such as a museum where on display there might be ancient artifacts, textiles or other fragile materials that are humidity or moisture sensitive. In these environments it is very important to have the option of a lower density setting.

2. User Controlled Vapor Speed Setting (1506).

The blower fan speed (1506) directly affects the velocity of the vapor output through the honeycomb. This can be used in conjunction with the density (1505) setting to help accomplish lower condensation in the honeycomb. For example, with a higher density setting, it may be beneficial to set the vapor fan speed higher as it will help force the increased moisture out of the honeycomb and help present condensation from gathering. However, a higher vapor speed generally increases the perceivable cell lines in the vapor screen from the honeycombs cell walls (1204).

3. User Controlled Fan Speed Setting (1507).

Generally the user variable fan speed setting remains at the lower end. However it can be increased when there are ambient airflows passing near the display from HVAC or heating systems, which will help to reduce the turbulence on the screen resulting from those alien air flows. However, the higher the fan speed, the more noticeable the honeycomb cell lines may become.

4. Fully Self-Contained Devices.

Figure 7:
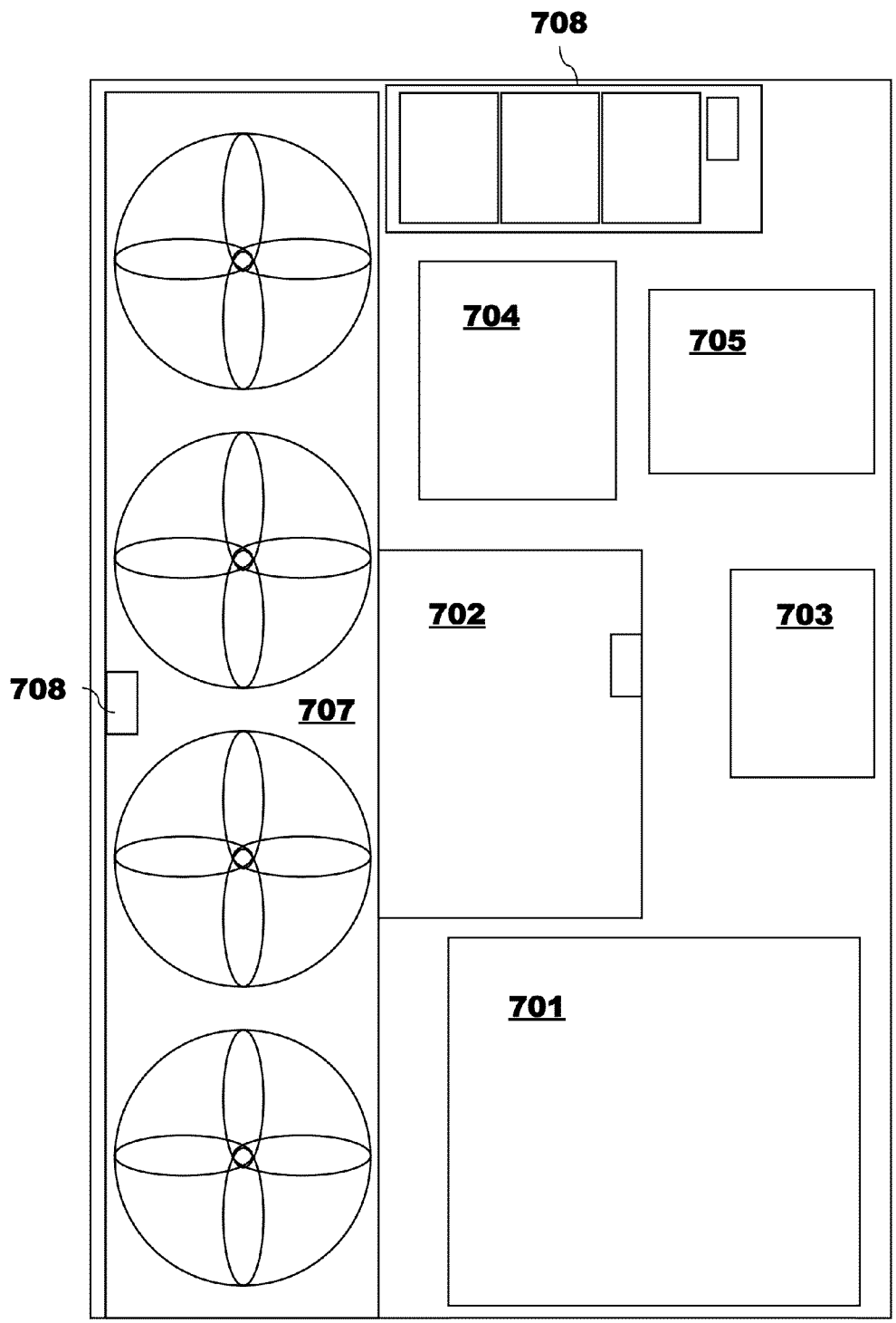
FIG. 7 shows a view of a self-contained table-top display, according to an embodiment of the invention.

Many users need these devices for use in traveling events or short-term installations. In these cases the user may benefit from a portable, fully self-contained device (FIG. 7). A self-contained device (FIG. 7) will have all hardware/software necessary to fully operate. This includes projection (702), media source (705), mirrors (703), interactive components (708), power supply (706) and water tank (701), which in similar devices are external. These self-contained features mean that there are lower setup/teardown time and costs involved, little technical training, easy operation, and simple maintenance.

5. User Configured Multi-Orientations.

Users that would use the device for various differing installations may appreciate the ability to change the orientation of the display as opposed to owning separate devices in single orientations. For example, an AV integrator has a tradeshow user that requires a display that will hang from the ceiling over one of their display pieces. The AV integrator is able to easily configure that display in a horizontal orientation emitting downward and fulfill that user's needs. The same AV integrator then has an industrial event user that needs a vertical standing display to host a "holographic" presenter. The AV integrator can use the same display, now in a vertical orientation, to please a different user, and only use one piece of hardware.

Certain embodiments of the invention enjoy the following advantages:

This product is advantageous and novel above the existing approaches in that it uses refined design characteristics on the internal workings as well as the final product.

Its use of a single nozzle versus multiple nozzles reduces visible lines and gaps within the display, it reduces the number of parts that can be damaged or require maintenance. It allows a higher efficiency in outputting the vapor medium.

Its use of larger fans reduces noise, turbulence and electricity use, as well as reduces number of parts that can be damaged or require maintenance.

These advances allow this technology to reach new markets. Old technologies were not sufficiently robust, or a proper fit for many environments. This device can now reliable be used in retail environments, public gathering spaces and other more demanding spaces.

A benefit of the modular design of components is the ability for certain components to remain in a certain orientation regardless of the orientation of other modular components. This is seen in the case of switching the airbox orientation from vertical to horizontal. If the expansion chamber were not modular and instead a fixed device it could not operate when the orientation (especially of the large or jumbo format) is switched. Since it is in fact modular, the orientation of the expansion chamber can remain vertical regardless of the orientation of other parts, which allows it to continue operation. This overcomes technical problems as the nature of water interaction with gravity, and the open orifices of the expansion chamber, it must always be oriented with said orifices facing upwards so water does not spill out and risk damaging the surrounding equipment. This is why the modular nature is a key factor in the claim of a device that can have its orientation switched by the relocation of modules.

The receiving trough avoids of accumulating water droplets that would otherwise need to be drained or removed in liquid form, is the act of using the same fan system that pulls the screen flow in (creating a more taught and stable screen) as well as absorbs water droplets into the sponge structure. Then the same fan evaporates the water with the exhaust.

The invention claimed is:

1. A device for forming a vapor display screen, the device comprising a water tank for holding water, an expansion chamber for creating vapor, an airbox for creating a laminar flow of air and vapor, a projector for projecting light onto the vapor display screen, a computer for executing software that supplies display content to the projector, and a power supply unit;
    wherein the airbox is an enclosure that comprises an airbox fan that pressurizes and pushes air and vapor through the airbox, a series of mesh and honeycomb panels that equalize the pressure of the air and vapor pushed through the airbox, and a nozzle having a single nozzle opening for emitting a sheet of vapor and a main nozzle tube for carrying vapor from the expansion chamber, and a nozzle drain to allow condensation buildup to drain back into the water tank;
    wherein the expansion chamber comprises a first water-tight container, a module for creating water vapor from liquid water, a floating water level switch, a pump for adding water to the expansion chamber from the water tank, a blower fan to pressurize the expansion chamber, and a vapor outlet that connects to the main nozzle tube within the airbox;
    wherein the water tank comprises a second water-tight container, a water input port, a water output port connected to the expansion chamber, a water drain port, a secondary water input from the nozzle drain, and water level indicator.

2. The device of claim 1 wherein the device further comprises a scent dispenser, wherein the airbox comprises a scent mist nozzle near the nozzle.

3. The device of claim 1 wherein the series of mesh and honeycomb panels comprise alternating layers of mesh and honeycomb.

4. The device of claim 3 wherein the honeycomb panels comprise hexagonal cells having 3/16 inch or, less preferably, between 1/8 inch and 1/4 inch width.

5. The device of claim 1 wherein the power supply unit comprises user-controllable potentiometers allowing the adjustment of output voltages supplied to different components of the device.

6. The device of claim 5 wherein the output voltage adjustment is +/−15%.

7. The device of claim 5 wherein the potentiometers allow control of the airbox fan speed and the blower fan speed.

8. The device of claim 1 wherein the device comprises interactive input hardware, and wherein the computer operates the interactive input hardware.

9. The device of claim 1 wherein the vapor consists of water droplets having mean diameters in the range from 10 microns to 20 microns.

10. The device of claim 1 wherein the laminar flow of air and vapor comprises between 1% and 5% water vapor.

11. The device of claim 1 wherein the device, during operation, consumes no more than 500 ml/h water for every 12 inch in nozzle length.

12. The device of claim 1 wherein the nozzle width is 3/16 inch.

13. The device of claim 1 wherein the expansion chamber has a modular design allowing it to change orientation, whereby the device may operate in different orientations.

14. The device of claim 1 wherein the device has only a single nozzle.

15. The device of claim 1 wherein the water tank, power supply unit, expansion chamber, airbox, computer, and projector, are modular components that can be replaced or re-oriented by an end user of the device.

16. A device for forming a vapor display screen, the device comprising a water tank for holding water, an expansion chamber for creating vapor, an airbox for creating a laminar flow of air and vapor, a projector for projecting light onto the vapor display screen, a computer for executing software that supplies display content to the projector, and a power supply unit;
    wherein the airbox comprises an airbox fan that pressurizes and pushes air and vapor through the airbox, a series of mesh and honeycomb panels that equalize the pressure of the air and vapor pushed through the airbox, and a nozzle having a single nozzle opening for emitting a sheet of vapor and a main nozzle tube for carrying vapor from the expansion chamber, and a nozzle drain to allow condensation buildup to drain back into the water tank;
    wherein the expansion chamber comprises a first water-tight container, a module for creating water vapor from liquid water, a floating water level switch, a pump for adding water to the expansion chamber from the water tank, a blower fan to pressurize the expansion chamber, and a vapor outlet that connects to the main nozzle tube within the airbox;

wherein the water tank comprises a second water-tight container, a water input port, a water output port connected to the expansion chamber, a water drain port, a secondary water input from the nozzle drain, and water level indicator;

wherein the power supply unit comprises user-controllable potentiometers allowing the adjustment of output voltages supplied to different components of the device.

17. The device of claim 16 wherein the output voltage adjustment is +/−15%.

18. The device of claim 16 wherein the potentiometers allow control of the airbox fan speed and the blower fan speed.

\* \* \* \* \*